(12) United States Patent
Holverson et al.

(10) Patent No.: US 11,224,934 B2
(45) Date of Patent: Jan. 18, 2022

(54) SYSTEMS, METHODS, AND APPARATUS TO WELD BY PREHEATING WELDING WIRE AND INDUCTIVELY HEATING A WORKPIECE

(71) Applicant: Illinois Tool Works Inc., Glenview, IL (US)

(72) Inventors: Todd Earl Holverson, Appleton, WI (US); James Francis Rappl, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 420 days.

(21) Appl. No.: 16/227,914

(22) Filed: Dec. 20, 2018

(65) Prior Publication Data
US 2019/0193191 A1 Jun. 27, 2019

Related U.S. Application Data

(60) Provisional application No. 62/609,580, filed on Dec. 22, 2017.

(51) Int. Cl.
*B23K 9/10* (2006.01)
*B23K 9/235* (2006.01)
(Continued)

(52) U.S. Cl.
CPC ............. *B23K 13/01* (2013.01); *B23K 9/095* (2013.01); *B23K 9/1093* (2013.01); *B23K 9/235* (2013.01); *B23K 13/08* (2013.01); *B23K 37/047* (2013.01)

(58) Field of Classification Search
CPC .............................. B23K 9/235; B23K 9/1093
See application file for complete search history.

(56) References Cited

U.S. PATENT DOCUMENTS 6,265,701 B1 7/2001 Bickel
7,087,854 B2 * 8/2006 Takahashi ............. B23K 11/115
219/91.22
(Continued)

FOREIGN PATENT DOCUMENTS

WO 2016105705 6/2016

OTHER PUBLICATIONS

Int'l Search Report and Written Opinion Appln. No. PCT/US2019/067061 dated Apr. 23, 2019.

*Primary Examiner* — Robert J Utama
*Assistant Examiner* — Lawrence H Samuels
(74) *Attorney, Agent, or Firm* — McAndrews, Held & Malloy, Ltd.

(57) ABSTRACT

Systems, methods, and apparatus to weld by preheating welding wire and inductively heating a workpiece are disclosed. An example welding system includes: a welding current source configured to provide welding current to a welding circuit, the welding circuit comprising an electrode wire and a first contact tip of a welding torch; an electrode preheating circuit configured to provide preheating current through a first portion of the electrode wire via a second contact tip of the welding torch; and at least one induction heating coil configured to apply induction heat to a workpiece, the welding current source, the electrode preheating circuit, and the induction heating coil configured to perform a preheating operation and a welding operation on the workpiece.

22 Claims, 16 Drawing Sheets

(51) Int. Cl.
    *B23K 13/01*     (2006.01)
    *B23K 37/047*     (2006.01)
    *B23K 13/08*     (2006.01)
    *B23K 9/095*     (2006.01)

(56) References Cited

U.S. PATENT DOCUMENTS

| | | | |
|---|---|---|---|
| 10,675,699 B2* | 6/2020 | Hsu | B23K 9/24 |
| 2014/0008354 A1 | 1/2014 | Pletcher | |
| 2014/0217077 A1* | 8/2014 | Davidson | B23K 9/1043 |
| | | | 219/130.33 |
| 2015/0083710 A1 | 3/2015 | Albrecht | |
| 2016/0105932 A1 | 4/2016 | Billy | |
| 2016/0105935 A1* | 4/2016 | Jones | B23K 10/00 |
| | | | 219/601 |
| 2017/0165778 A1* | 6/2017 | Hsu | B23K 9/1093 |
| 2018/0333798 A1* | 11/2018 | Uecker | B23K 9/1093 |

\* cited by examiner

SYSTEMS, METHODS, AND APPARATUS TO WELD BY PREHEATING WELDING WIRE AND INDUCTIVELY HEATING A WORKPIECE

BACKGROUND

This disclosure relates generally to welding and, more particularly, to systems, methods, and apparatus to weld by preheating welding wire and inductively heating a workpiece.

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch and/or by flux. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

Productivity is of high importance in any manufacturing operation. In many manufacturing operations, welding of workpieces is an important and integral part of producing high quality assemblies. A number of welding systems have been used and are being developed, including gas metal arc welding (GMAW), gas tungsten arc welding (GTAW), shielded metal arc welding (SMAW), submerged arc welding (SAW), and so forth. Any of these welding systems may be used depending upon such factors as the parts to be joined, the size and thicknesses of the materials, the final assembly desired, and the materials used.

While very effective in many applications, these welding techniques may experience different initial welding performance based upon whether the weld is started with the electrode "cold" or "hot." In general, a cold electrode start may be considered a start in which the electrode tip and adjacent metals are at or relatively near the ambient temperature. Hot electrode starts, by contrast, are typically those in which the electrode tip and the adjacent metals' temperature are much more elevated, but below the melting point of the electrode wire. In some applications, it is believed that initiation of welding arcs and welds is facilitated when the electrode is hot. However, the current state of the art does not provide regimes designed to ensure that the electrode is heated prior to initiation of a welding operation.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
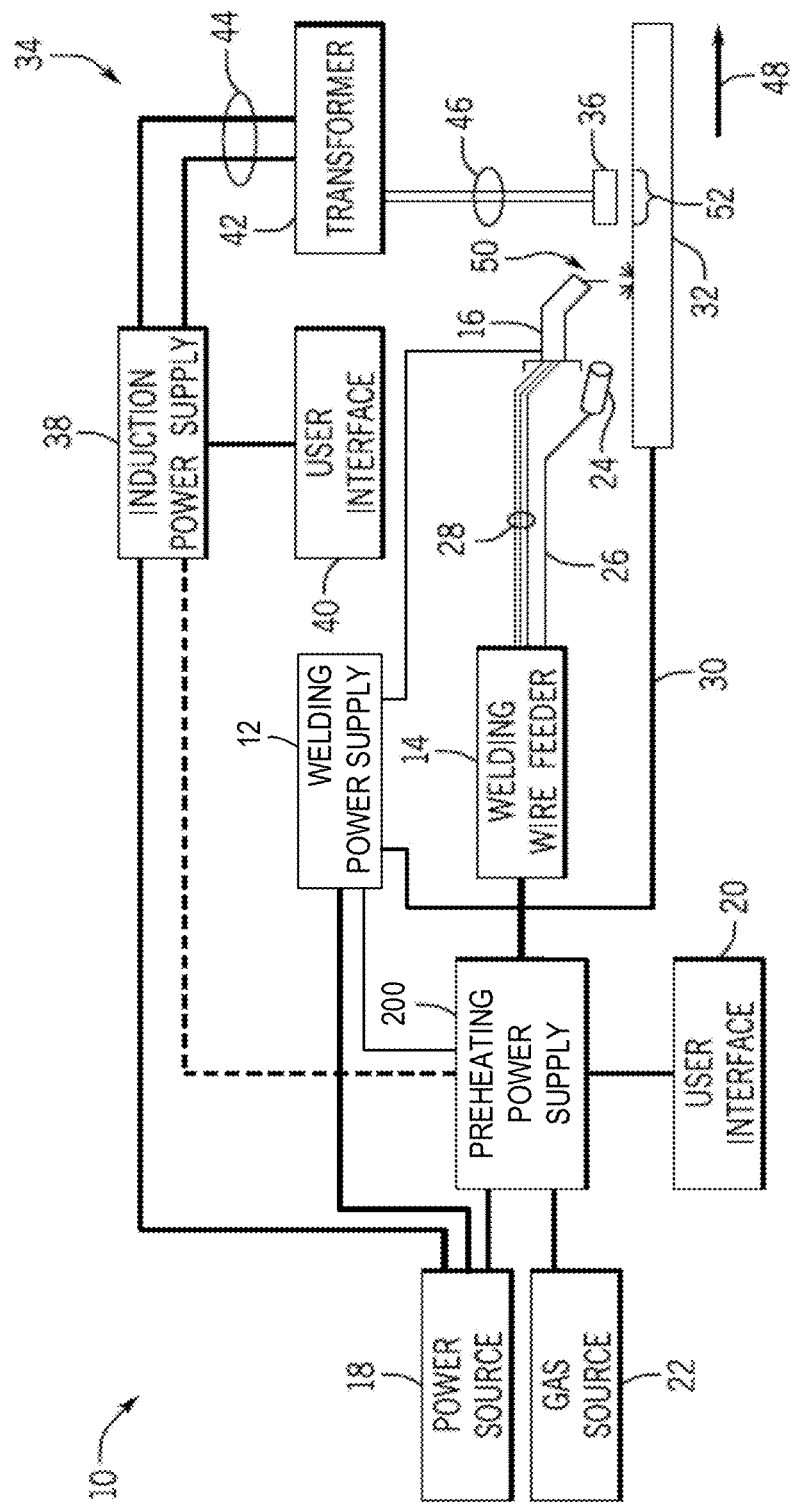
FIG. 1 is a block diagram of an exemplary welding system including an induction heating system configured to increase temperatures of a weld location ahead of the welding process.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a wire-fed welding-type system refers to a system capable of performing welding (e.g., gas metal arc welding (GMAW), gas tungsten arc welding (GTAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

A hybrid induction metal working process is disclosed that utilizes an induction heating source in conjunction with a metal working system, such as a welding system. While the embodiments are described herein as welding processes, disclosed examples may be used for metal working processes more generally, such as cutting operations, cladding operations, bending operations, heat treating operations, preparation and post working operations, and so forth. In at least some of the embodiments described, a GMAW process is assumed that utilizes one or more welding power sources, one or more welding torches receiving power and shielding gas, and one or more wire feeders that provides the needed power, gas and welding wire electrode through the one or more welding torches.

Moreover, the disclosed embodiments may be used in conjunction with one or more of the systems and processes set forth in the following, each of which is hereby incorporated by reference in its entirety for all purposes: U.S. patent application Ser. No. 13/111,433, entitled "AUXILIARY WELDING HEATING SYSTEM," filed by Holverson et al. on May 19, 2011; U.S. patent application Ser. No. 14/280,164, entitled "INDUCTION HEATING SYSTEM," filed by Beistle et al. on May 16, 2014; U.S. patent application Ser. No. 14/280,197, entitled "INDUCTION HEATING SYSTEM TEMPERATURE SENSOR ASSEMBLY," filed by Verhagen et al. on May 16, 2014; U.S. patent application Ser. No. 14/280,227, entitled "INDUCTION HEATING SYSTEM TRAVEL SENSOR ASSEMBLY," filed by Garvey et al. on May 16, 2014; U.S. patent application Ser. No. 14/494,248, entitled "METAL HEATING AND WORKING SYSTEM AND METHOD," filed by Albrecht et al. on Sep. 23, 2014; U.S. patent application Ser. No. 14/532,695, entitled "LARGE SCALE METAL FORMING," filed by Jones et al. on Nov. 4, 2014; U.S. patent application Ser. No. 14/705,738, entitled "LARGE SCALE METAL FORMING CONTROL SYSTEM AND METHOD," filed by Jones et al. on May 6, 2015; U.S. patent application Ser. No. 14/879,727, entitled "High-productivity hybrid induction heating/welding assembly," filed by Jones et al. on Oct. 9, 2015; U.S. patent application Ser. No. 14/879,716, entitled "Reduced-distortion hybrid induction heating/welding assembly," filed by Jones et al. on Oct. 9, 2015; and U.S. patent application Ser. No. 14/879,735, entitled "Hybrid induction heating/welding assembly," filed by Jones et al. on Oct. 9, 2015.

Disclosed example welding systems include: a welding current source to provide welding current to a welding circuit, in which the welding circuit includes an electrode wire and a first contact tip of a welding torch; an electrode preheating circuit to provide preheating current through a first portion of the electrode wire via a second contact tip of the welding torch; and at least one induction heating coil to apply induction heat to a workpiece, in which the welding current source, the electrode preheating circuit, and the induction heating coil perform a preheating operation and a welding operation on the workpiece.

In some example welding systems, the welding current source and the electrode preheating circuit generate a welding heat profile in a workpiece, in which the at least one induction heating coil generates an induction heat profile in the workpiece by applying the induction heat, and the welding current source, the electrode preheating circuit, and the at least one induction heating coil combine the welding heat profile and the induction heat profile to generate a combined heat profile in the workpiece. Some such example systems further include control circuitry to: estimate the welding heat profile and the induction heat profile in the workpiece based on an input during the welding operation, estimate the combined heat profile based on the estimated welding heat profile and the estimated induction heat profile, and control a positioning of the welding torch, the at least one induction heating coil, or both, based on the estimated combined heat profile.

In some such examples, the control circuitry estimates at least one of the welding heat profile or the induction heat profile in the workpiece based on feedback from one or more sensors. In some examples, the one or more sensors include at least one of: a position-detecting sensor to detect a position of at least one of the welding torch or the at least one induction heating coil, relative to the workpiece; or a temperature sensor to detect a temperature proximate the workpiece.

Some example systems further include a control circuit to compare the combined heat profile to a predetermined heat profile, and control at least one of the welding current, the preheating current, the induction heat, a positioning of the welding torch, or a positioning of the at least one induction heating coil, based on the comparison. In some examples, the welding heat profile includes a first predetermined distribution of heat in the workpiece and the induction heat profile includes a second predetermined distribution of heat in the workpiece.

Some example welding systems further include control circuitry to control the positioning of the welding torch, the at least one induction heating coil, or both, by transmitting control signals to at least one robotic manipulator. In some examples, the control circuitry controls the positioning of the welding torch, the at least one induction heating coil, or both, to minimize distortion in the workpiece. In some examples, the control circuitry controls the positioning of the welding torch, the at least one induction heating coil, or both, to produce substantially evenly distributed heat on inner surfaces of the workpiece.

Some example welding systems further include control circuitry to control at least one of the welding current, the preheating current, or the induction heat based on a target heat input to the workpiece. Some examples further include control circuitry to control at least one of the welding current, welding voltage, preheating voltage, or the preheating current based on at least one of a power provided to the at least one induction heating coil or a temperature of the workpiece, sensed by a temperature sensor, following heating by the at least one induction heating coil.

In some examples, the electrode preheating circuit reduces cast in the electrode wire via the preheating current, prior to the electrode wire exiting the first contact tip. Some example welding systems further include a control circuit to determine a change in a contact-tip-to-work-distance of the welding torch based on at least one of the welding current or the preheating current, and adjust at least one of the preheating current or a wire feed speed based on the change in the contact-tip-to-work-distance. Some example welding systems further include: a preheating feedback circuit configured to measure a preheating voltage; and a control circuit configured to: control the preheating current based on the preheating voltage; and control the electrode preheating circuit to adjust the preheating current in response to detecting an invalid preheat voltage measured by the preheating feedback circuit.

Some example welding systems further include a control circuit to control the electrode preheating circuit based on an input specifying a preheating parameter. In some examples, the preheating parameter includes at least one of the preheating current, a preheating voltage, a preheating wattage, impedance, an electrode temperature, a power balance between the preheating wattage and arc wattage, a total heat input to the workpiece, a preheating enthalpy, a penetration value, a workpiece thickness, a joint type of the workpiece, a material type of the workpiece, a shielding gas type, or a wire diameter of the electrode wire. In some examples, the control circuit is configured to control at least one of a welding parameter or an induction heating parameter based on the preheating parameter.

In some examples, the electrode preheating circuit reduces diffusible hydrogen present in the electrode wire. Some examples include a control circuit to control at least one of the welding current, the preheating current, or the induction heat based on a travel speed of the at least one induction heating coil and the welding torch relative to the workpiece. In some examples, the electrode preheating circuit includes a second power source configured to provide the preheating current. Some examples include an induction heating power source configured to provide power to the at least one induction heating coil. In some examples, the electrode preheating circuit includes at least one of the first contact tip or a third contact tip. Some example welding systems include a control circuit to monitor a voltage drop across a second portion of the electrode wire and to adjust at least one of the welding current or the preheating current based on the voltage drop, in which the second portion of the electrode wire includes at least part of the first portion of the electrode wire.

Turning now to the drawings, FIG. 1 illustrates an exemplary welding system 10 which powers, controls, and provides consumables to a welding operation. The welding system 10 includes a welding power supply 12, a wire feeder 14 (or multiple wire feeders 14, in certain embodiments), and a welding torch 16 (or multiple welding torches 16, in certain embodiments). The power supply 12 may be a power converter or an inverter-based welding power supply (or multiple power supplies that may not be the same type) that receives electrical power from a power source 18. In some examples, the power supply 12 is a welding current source that provides welding current to a welding circuit. As described in more detail below, the welding circuit includes an electrode wire and a first contact tip of the welding torch 16. In some examples, multiple power supplies 12 (of the same or different types) may be connected to one or more wire feeders 14 and one or more welding torches 16. Many different circuit designs may be provided in the power source 18, and many different welding regimes may be envisaged (e.g., direct current, alternating current, pulsed, short circuit, etc. Any of these conventional circuits and process technologies may be used in conjunction with the present induction heating techniques. In other embodiments, the welding power supply 12 may be a generator or alternator welding power supply which may include an internal combustion engine. The welding power supply 12 may also include a user interface 20 for adjusting various welding parameters such as voltage and current, and for connecting a power source 18, if required. Additionally, a gas source 22 may be coupled to the welding power supply 12. The gas source 22 is the source of the shielding gas that is supplied to the welding torch 16. In addition, in certain embodiments, the gas source 22 also supplies shielding gas to an auxiliary shielding gas diffuser 24. For example, in certain embodiments, the gas source 22 may supply argon gas, carbon dioxide, oxygen, helium, and/or any other shielding gases and/or combinations of shielding gases. As will be appreciated, the shielding gas is applied to the location of the liquid weld pool by the welding torch 16 and/or the auxiliary gas diffuser 24 to prevent absorption of atmospheric gases which may cause metallurgical damage to the weld.

The example welding system 10 of FIG. 1 further includes a preheating power supply 200. As shown, the preheating power supply 200 is coupled to the welding wire feeder 14. For example, the preheating power supply 200 may be coupled to the welding wire feeder 14 by a feeder power lead, a weld cable, a gas hose, and a control cable. The preheating power supply 200 may be implemented, for example, using a second welding power supply.

The welding wire feeder 14 shown in the illustrated example provides welding wire to the welding torch 16 for use in the welding operation. A variety of welding wires may be used. For example, the welding wire may be solid steel, solid aluminum, solid stainless steel, metal cored wire, flux cored wire, flat strip electrode, and so forth. The embodiments described herein may be used with any suitable type of electrode (or cold wire feed, in certain embodiments), and any suitable wire composition. Furthermore, the thickness of the welding wire may vary depending on the welding application for which the welding wire is used. For example, the welding wire may be 0.023", 0.035", 0.045", 0.052", 1/16", 5/64", 3/32", 1/8", or any other diameter. Furthermore, the welding wire feeder 14 may enclose a variety of internal components such as a wire feed drive system, an electric motor assembly, an electric motor, and so forth. The welding wire feeder 14 may further include another user interface (not shown) that allows a user to set one or more power parameters, such as welding voltage, welding current, preheating voltage, and/or preheating current, and/or wire feed parameters, such as wire feed speed. In the illustrated embodiment, the auxiliary shielding gas diffuser 24 is also coupled to the welding wire feeder 14 by a gas hose 26 (or may be connected directly to the gas source and controlled from the user interface 20). However, the welding wire feeder 14 may be used with any wire feeding process including gas operations (gas metal arc welding (GMAW)), gasless operations (shielded metal arc welding (SMAW) or self-shielding flux cored arc welding (FCAW)), submerged arc welding (SAW), and so forth.

As shown, the welding wire is fed to the welding torch 16 through a first cable 28. The first cable 28 (e.g., a weld cable) may also supply gas to the welding torch 16, and may also supply cooling water to the welding torch 16. As further shown, a second cable 30 (e.g., a work cable) couples the welding power supply 12 to a workpiece 32 (e.g., via a clamp) to complete the circuit between the welding power supply 12 and the welding torch 16 during a welding operation.

The exemplary welding system 10 also includes an induction heating system 34. As mentioned above, the induction heating system 34 includes an induction heating coil 36 and an induction power supply 38. The induction power supply 38 includes a user interface 40. The user interface 40 may include buttons, knobs, dials, touch screen displays, switches, and so forth, to allow an operator to regulate various operating parameters of the induction power supply 38. For example, the user interface 40 may be configured to enable an operator to set and adjust the frequency of the alternating current produced by the induction power supply 38. Similarly, the user interface 40 may enable an operator to select a desired output temperature of the induction heating coil 36. The user interface 40 may also include one or more displays configured to provide system feedback to the operator (e.g., real-time temperature of the induction heating coil 36, travel speed of the induction heating coil 36 relative to the workpiece 32, and so forth). In certain embodiments, the induction power supply 38 may be coupled to a step-down transformer 42 with electrical wire conductors 44. More specifically, two electrical wire conductors 44 are routed from the induction power supply 38 to the transformer 42, and each electrical wire conductor 44 is routed inside a flexible tube or conduit. Furthermore, the induction heating system 34 may be an air-cooled or a liquid-cooled system. For example, a coolant may flow inside the flexible tubes routing each of the electrical wire conductors 44. In certain embodiments, one flexible tube routing an electrical wire conductor 44 contains a flowing coolant which enters the transformer 42, and another flexible tube routing an electrical wire conductor 44 contains a flowing coolant which flows from the transformer 42 to a heat exchanger or other device that removes heat from the coolant.

The alternating electrical current exits the transformer 42 and is supplied to the induction heating coil 36 by electrical conductors 46. In certain embodiments, the electrical conductors 46 may have a hollow core and may also route the flowing coolant through the induction heating coil 36. In the illustrated embodiment, the induction heating coil 36 is disposed proximate to the workpiece 32. As the alternating current flows through the induction heating coil 36, eddy currents are generated and induced within the workpiece 32. The eddy currents flow against the electrical resistivity of the workpiece 32, thereby generating localized heat in the workpiece 32. As shown, the induction heating coil 36 is positioned ahead of the welding torch 16. In other words, for a welding torch 16 operating and traveling in a direction 48, the induction heating coil 36 is placed in front of the welding torch 16 (i.e., along the weld joint and before a welding arc 50 created by the welding torch 16). As a result, the induction heating coil 36 heats a localized area 52 of the workpiece 32 immediately ahead of the welding arc 50, thereby raising the temperature of the localized area 52 just ahead of the welding arc 50. As will be appreciated by those skilled in the art, such temperatures are generally substantially higher than conventional "preheat" temperatures (and may reach as high as the melting point). Consequently, as the welding torch 16 travels in the direction 48, less heat from welding arc 50 is needed to bring the localized area 52 of the workpiece 32 to melting temperature. Therefore, more heat generated by the welding arc 50 may be used to melt the welding wire so that the welding wire may be fed to the welding arc at higher rates, which enables the welding torch 16 to complete the weld of the workpiece 32 at higher speeds. As such, the combination of features of the hybrid induction heating/welding assembly 90 described herein may lead to double (or even triple) the welding rate as compared to comparable conventional welds.

As shown, the welding power supply 12, the induction power supply 38, and/or the preheating power supply 200 may be coupled. For example the welding power supply 12, the induction power supply 38, and/or the preheating power supply 200 may be coupled by a hard wire, through a wireless connection, over a network, and so forth. As discussed in detail below, the welding power supply 12, the induction power supply 38, and/or the preheating power supply 200 may exchange data and information during the operation of the exemplary welding system 10. More particularly, the welding power supply 12, the induction power supply 38, and/or the preheating power supply 200 may function in cooperation (e.g., utilize feedback from one another) to adjust various operating parameters of the exemplary welding system 10.

Modifications to the exemplary welding system 10 of FIG. 1 may be made in accordance with aspects of the present disclosure. Although the illustrated examples are described in the context of an arc welding process, the features of the examples may be utilized with a variety of other suitable welding or cutting systems and processes. For example, while the induction heating system 34 is positioned ahead of the welding torch 16 in the present embodiment, the induction heating system 34 may be positioned in other locations. For example, the induction heating system 34 may be positioned behind the welding torch 16 to provide a heat treatment to a weld location after the workpiece 32 is welded and fused. Similarly, certain embodiments may include more than one induction heating system 34 or induction heating coil 36 (i.e., a first induction heating system 34 or induction heating coil 36 positioned ahead of the welding torch 16 to raise the temperature of the localized area 52, a second heating system 34 or induction heating coil 36 positioned behind the welding torch 16 to provide a heat treatment of a weld location that has been fused), and/or a third heating system 34 or induction heating coil 36 to heat the workpiece 32 ahead or behind of the welding process to reduce the rate of cooling of the weld to prevent metallurgical damage.

Figure 2:
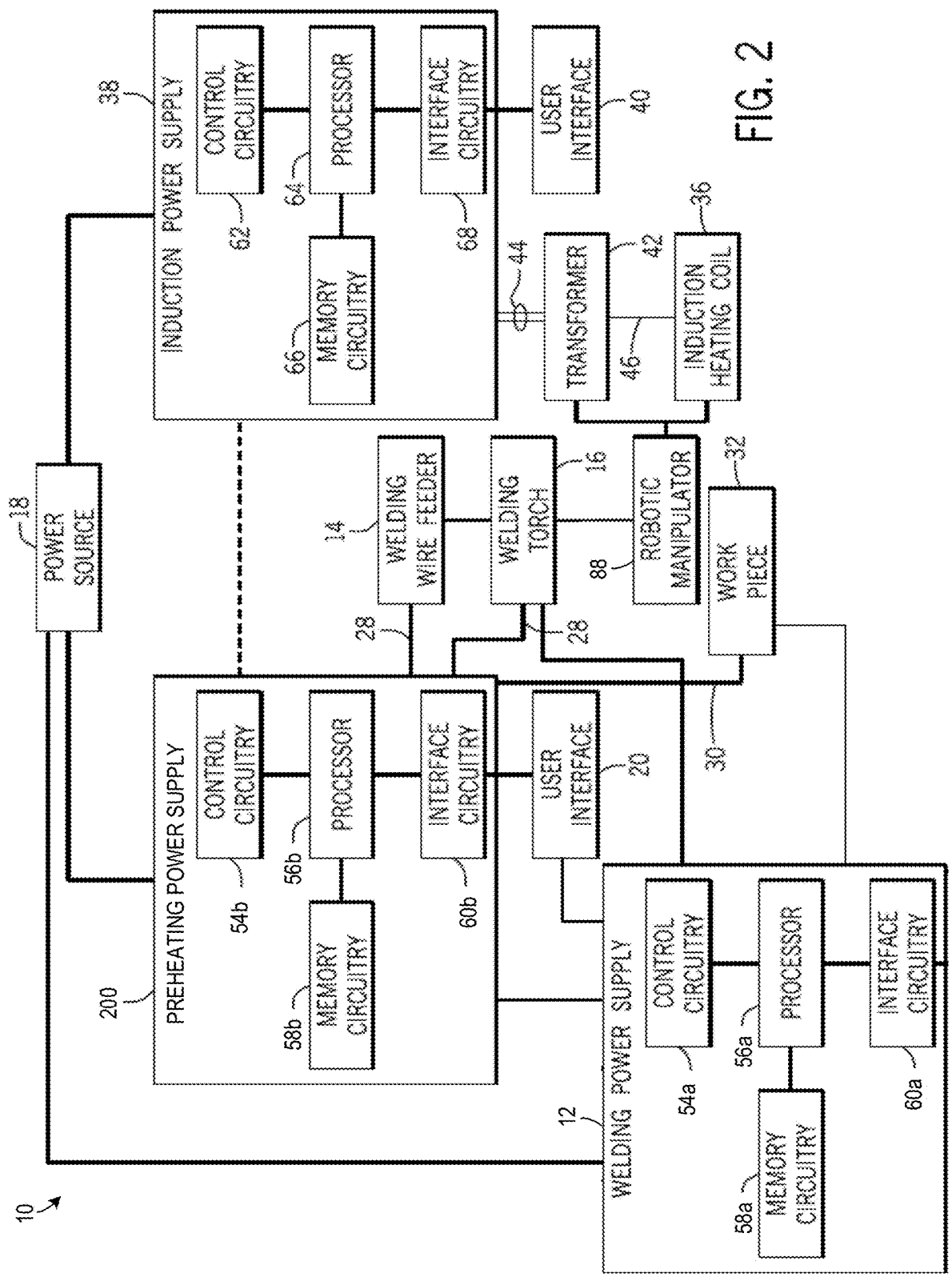
FIG. 2 is a block diagram illustrating exemplary functional components of the welding system and induction heating system of FIG. 1, in accordance with aspects of the present disclosure.

FIG. 2 is a block diagram illustrating certain of the internal components of the exemplary welding system 10. As discussed above, the power source 18 may power one or more welding power supplies 12, one or more induction power supplies 38, and/or one or more preheating power supplies 200. The preheating power supply 200 provides power to a welding wire feeder 14, or directly to the welding torch 16, to preheat an electrode wire via resistive heating. The welding power supply 12 is coupled to the welding torch 16 and to the workpiece 32, thereby completing the circuit between the welding power supply 12 and the welding torch 16 during a welding operation. The example welding power supply 12 and the preheating power supply 200 may utilize the same conductor to conduct both preheating current and welding current.

Each induction power supply 38 generates an alternating electrical current that is supplied to a transformer 42, which subsequently routes the current to an induction heating coil 36. As mentioned above, the welding power supply 12, the induction power supply 38, and/or the preheating power supply 200 may be coupled and configured to exchange information and data (e.g., operating parameters, settings, user input, system feedback, sensors etc.) to enable the welding power supply 12, the induction power supply 38, and/or the preheating power supply 200 to function cooperatively.

The welding power supply 12 includes several internal components to regulate various operating parameters of the welding system 10. In the illustrated embodiment, the welding power supply 12 includes control circuitry 54a, a processor 56a, memory circuitry 58a, and interface circuitry 60a. The control circuitry 54a is configured to apply control signals to the welding power supply 12 to output power to the welding torch 16.

The control circuitry 54a is further coupled to the processor 56a, memory circuitry 58a and interface circuitry 60a. The interface circuitry 60a is coupled to the user interface 20 of the welding power supply 12. As discussed above, the user interface 20 is configured to enable an operator to input and control various settings of the welding power supply 12. For example, the user interface 20 may include a menu for selecting a desired voltage or current output to the welding wire feeder 14. Additionally, the user interface 20 may include a menu or list of welding processes or welding wire materials and diameters. As will be appreciated, different welding processes, welding wire materials, and welding wire diameters may have different characteristics and may require differing configurations for various operating parameters. For example, configuration parameters requiring differing values may include voltage output, current output, wire feed speed, wire feed torque, and so forth. Preset values for such configuration parameters, as well as others, may be stored in the memory circuitry 58a for each of a variety of welding processes, welding wire materials, and welding wire diameters.

By way of example, a user may select a welding process from a menu of a plurality of different welding processes displayed on the user interface 20 of the welding power supply 12. The user interface 20 communicates the selection of the welding process to the interface circuitry 60a, which communicates the selection to the processor 56a. The processor 56a then retrieves the particular configuration parameters for the welding process stored in the memory circuitry 58a. Thereafter, the processor 56a sends the configuration parameters to the control circuitry 54a in order that the control circuitry 54a may apply appropriate control signals to the welding wire feeder 14. In some examples, as discussed below, the control circuitry 54a of the welding power supply 12 may also communicate the configuration parameters to the induction power supply 38 and/or the preheating power supply 200.

The preheating power supply 200 may be implemented using a welding power supply, and includes control circuitry 54b, a processor 56b, memory circuitry 58b, and interface circuitry 60b. The control circuitry 54b, the processor 56b, the memory circuitry 58b, and the interface circuitry 60b may be similar or identical to the components of the welding power supply 12. The control circuitry 54b applies control signals to the preheating power supply 200 and/or the welding wire feeder 14. For example, the control circuitry 54b may provide control signals to the welding wire feeder 14 relating to the voltage or current provided by the preheating power supply 200 and/or the welding power supply 12. The control circuitry 54b may also provide control signals for regulating the operation of the welding wire feeder 14 such as pulse width modulated (PWM) signals to regulate a duty cycle for a motor assembly in the welding wire feeder 14.

In the illustrated embodiment, the induction power supply 38 includes control circuitry 62, a processor 64, memory circuitry 66, and interface circuitry 68. The control circuitry 62 is configured to apply control signals to the induction power supply 38 and/or the transformer 42. For example, the control circuitry 62 may provide control signals relating to the alternating electrical current (e.g., alternating current frequency) supplied by the induction power supply 38 to the transformer 42. Additionally, the control circuitry 62 may regulate the operation of a cooling system used with the induction power supply 38 and/or the transformer 42. As mentioned above, the induction heating system 34 may use air or a coolant to provide circulating cooling throughout the induction heating system 34. For example, the control circuitry 62 may regulate a flow of a liquid coolant through the transformer 42 and the induction heating coil 36 to maintain a desired temperature of the induction heating system 34.

The control circuitry 62 is further coupled to the processor 64, memory circuitry 66, and interface circuitry 68. The interface circuitry 68 is coupled to the user interface 40 of the induction power supply 38. As mentioned above, the user interface 40 of the induction power supply 38 enables an operator to regulate one or more operating parameters or settings of the induction power supply 38. For example, the user interface 40 may enable a user to select a particular design of the induction heating coil 36 from a menu of designs. As will be appreciated, different induction heating coil 36 designs may have different configuration parameters. For example, different designs may have different maximum operating temperatures, and may require different frequencies of alternating current to achieve a desired temperature. Similarly, the coolant used to cool the induction heating system 34 may have different configuration parameters (e.g., heat transfer coefficients, viscosities, flow rates, and so forth). Preset values for such configuration parameters, as well as others, may be stored in the memory circuitry 66. For example, the user interface 40 may communicate a user selection of the induction heating coil 36 designs to the interface circuitry 68, which may communicate the selection to the processor 64. The processor 64 may then retrieve the particular configuration parameters for the induction heating coil 36 stored in the memory circuitry 66. Thereafter, the processor 64 sends the configuration parameters to the control circuitry 62 in order that the control circuitry 62 may apply appropriate control signals to the induction power supply 38 and the transformer 42.

As mentioned above, the welding power supply 12, the induction power supply 38, and/or the preheating power supply 200 may be coupled to one another by a hard wire, wireless connection, network connection, or the like. In particular, the welding power supply 12, the induction power supply 38, and/or the preheating power supply 200 may be configured to send and receive data and information to one another relating to the operating of the welding system 10. For example, the welding power supply 12, the induction power supply 38, and/or the preheating power supply 200 may communicate with one another to coordinate the speed of the induction heating coil 36 and the welding torch 16 along the workpiece 32. In some examples, the induction heating coil 36 and the welding torch 16 are both designed for automated operation. As a result, the welding power supply 12, the induction power supply 38, and/or the preheating power supply 200 may be coupled and configured to communicate and actively adjust a distance between the induction heating coil 36 and the welding arc 50, as the induction heating coil 36 and the welding torch 16 travel along the workpiece 32 in the direction 48. For example, the welding torch 16 and the induction heating coil 36 may each have sensors configured to measure a travel speed or temperature along the workpiece 32.

The welding power supply 12 or the preheating power supply 200 may communicate a user selected welding process (i.e., a welding process selected by an operator through the user interface 20) to the induction power supply 38. More specifically, the control circuitry 54a of the welding power supply 12 (and/or the control circuitry 54b of the preheating power supply 200) may communicate the welding process selection to the control circuitry 62 of the induction power supply 38. Thereafter, the control circuitry 62 of the induction power supply 38 may modify any of a variety of operating parameters based on the user selected welding process. For example, the control circuitry 62 may begin or end the process, or regulate the frequency or amplitude of the alternating current provided to the induction heating coil 36 or the flow rate of a coolant through the transformer 42 and/or the induction heating coil 36 to achieve a desired maximum temperature of the induction heating coil 36 based on the welding process selected. More specifically, for a selected welding process, the processor 64 may retrieve configuration parameters for the selected welding process from the memory circuitry 66 and send the configuration parameters to the control circuitry 62. Similarly, the control circuitry 62 of the induction power supply 38 may send operating information or data to the control circuitry 54a of the welding power supply 12 and/or the control circuitry 54b of the preheating power supply 200. For example, the control circuitry 62 may send temperature data (e.g., maximum temperature or real-time temperature) of the induction heating coil 36 to the control circuitry 54a of the welding power supply 12 and/or the control circuitry 54b of the preheating power supply 200. Thereafter, the control circuitry 54a of the welding power supply 12 and/or the control circuitry 54b of the preheating power supply 200 may adjust one or more operating parameters of the welding power supply and/or welding wire feeder 14 in response to the data received from the induction power supply 38. For example, the control circuitry 54a of the welding power supply 12 and/or the control circuitry 54b of the preheating power supply 200 may begin or end the welding process or adjust the wire feed speed or torque of the welding wire feeder 14 based on the temperature data of the induction heating coil 36 received from the control circuitry 62 of the induction power supply 38. For higher temperatures provided by the induction heating coil 36 to the localized area 52 of the workpiece 32 ahead of the welding arc 50, a slower or faster wire feed speed may be needed.

In some examples, the power supplies and control circuits used for generation and control of induction heating power and welding power may be joined. That is, some or all of the circuits may be provided in a single power supply, and certain of the circuits may serve both functions (e.g., operator interface components). Additionally, a central controller may provide coordination and synchronization commands to both the welding/cutting system and the induction system.

While reference is sometimes made in the present disclosure to advancement or movement of the welding torch 16 and adjacent induction heating system 34, depending upon the welding system design, the welding torch 16 and the induction heating system 34 may be displaced, while in other systems the welding system design, the welding torch 16 remain generally stationary, with the workpiece or workpieces being moved. (e.g., in certain robotic or automated operations, in submerged arc applications, etc.). References to moving the welding torch 16 and the induction heating system 34 include any relative motion between these components and the workpiece(s) 32.

Figure 3:
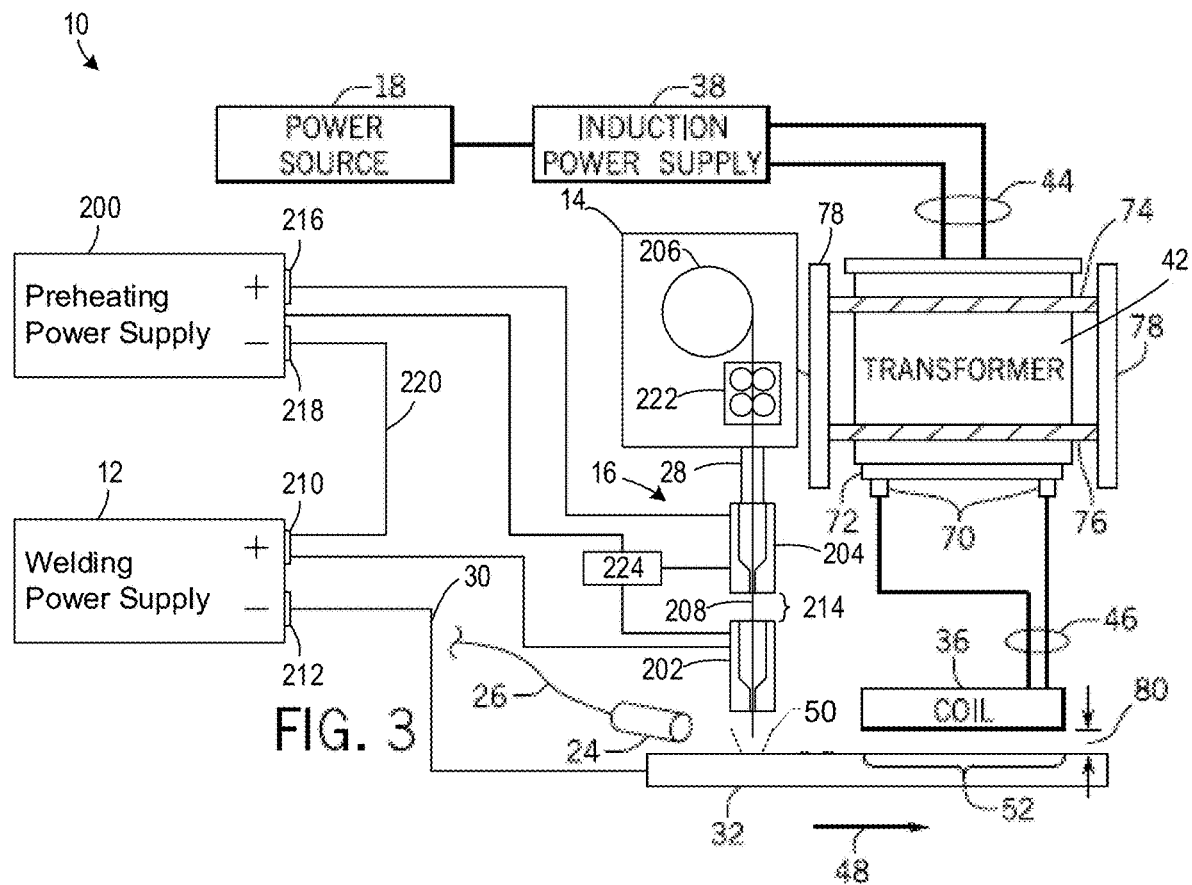
FIG. 3 is a block diagram illustrating exemplary functional components of the welding system and the induction heating system of FIG. 1, in accordance with aspects of the present disclosure.

FIG. 3 is a block diagram of an embodiment of the welding system and the induction heating system 34 of FIG. 1, illustrating the induction power supply 38, the step-down transformer 42, and the induction heating coil 36 positioned ahead of the welding arc 50 produced by the welding torch 16. FIG. 3 further illustrates a functional diagram of an example welding torch 16 that may be used to provide welding power and preheating power to the welding torch 16.

As illustrated in FIG. 3, the welding torch 16 has a first contact tip 202 and a second contact tip 204. The wire feeder 14 includes a wire spool 206, and feeds electrode wire 208 from the wire spool 206 to the torch 16 using a wire drive 222. The electrode wire 208 exits the wire feeder 14 and travels through the weld cable 28 (e.g., within a wire liner). The welding torch 16 feeds the electrode wire 208 from the wire spool 206 to the workpiece 32 to produce the welding arc 50.

In operation, the electrode wire 208 passes from the wire spool 206 through the second contact tip 204 and the first contact tip 202, between which the preheating power supply 200 generates a preheating current to heat the electrode wire 208. Specifically, in the configuration shown in FIG. 2, the preheating current enters the electrode wire 208 via the second contact tip 204 and exits via the first contact tip 202.

At the first contact tip 202, a welding current may also enter the electrode wire 208. The welding current is generated, or otherwise provided by, the welding power supply 12. The welding current exits the electrode wire 208 via the workpiece 32, which in turn generates the welding arc 50. When arc 50 is initiated between the electrode wire 208 and the workpiece 32, an electrical circuit is completed and the welding current flows through the electrode wire 208, across the metal work piece(s) 32, and returns to the welding power supply 12. The welding current causes the electrode wire 208 and the parent metal of the work piece(s) 32 to melt, thereby joining the work pieces as the melt solidifies. By preheating the electrode wire 208, the welding arc 50 may be generated with drastically reduced arc energy.

The welding current is generated, or otherwise provided by, the welding power supply 12 as disclosed herein, while the preheating current is generated, or otherwise provided by, the preheating power supply 200. The preheating power supply 200 and the welding power supply 12 may ultimately share a common power source (e.g., the power source 18, such as a common generator or line current connection), but the current from the power source 18 is converted, inverted, and/or regulated to yield the two separate currents—the preheating current and the welding current. For instance, the preheat operation may be facilitated with a single power source and associated converter circuitry, in which case three leads may extend from a single power source.

During operation, the welding power supply 12 establishes a welding circuit to conduct welding current from the welding power supply 12 to the first contact tip 202, and returns to the power supply 12 via the welding arc 50, the workpiece 32, and the work cable 30. To enable connection between the welding power supply 12 and the first contact tip 202 and the workpiece 32, the welding power supply 12 includes terminals 210, 212 (e.g., a positive terminal and a negative terminal).

During operation, the preheating power supply 200 establishes an electrode preheating circuit to conduct preheating current through a section 214 of the electrode wire 208 via the contact tips 202, 204 of the welding torch 16. To enable connection between the preheating power supply 200 and the contact tips 202, 204, the preheating power supply 200 includes terminals 216, 218. The preheating current flows from the preheating power supply 200 to the second contact tip 204, the section 214 of the electrode wire 208, the first contact tip 202, and returns to the preheating power supply 200 via a cable 220 connecting the terminal 210 of the welding power supply 12 and, thus, to the first contact tip 202, to the terminal 218 of the preheating power supply 200.

Because the preheating current path is superimposed with the welding current path over the connection between the first contact tip 202 and the power supplies 12, 200, the cable 220 may enable a more cost-effective single connection between the first contact tip 202 and the power supplies 12, 200 (e.g., a single cable) than providing separate connections for the welding current to the first contact tip 202 and for the preheating current to the first contact tip 202. In other examples, the terminal 218 of the preheating power supply 200 is connected to the first contact tip 202 via a separate path than the path between the first contact tip 202 and the welding power supply 12.

The welding power supply 12 and the electrode preheating circuit generate a welding heat profile in the workpiece 32. Example systems and methods to preheat welding wire that may be used to implement the preheating power supply 200, the welding torch 16, the welding power supply 12 are disclosed in U.S. patent application Ser. No. 15/343,992, filed Nov. 4, 2016, entitled "Systems, Methods, and Apparatus to Preheat Welding Wire." The entirety of U.S. patent application Ser. No. 15/343,992 is incorporated herein by reference.

As discussed above, the transformer 42 is coupled to the induction power supply 38 by electrical wire conductors 44. The induction power supply 38 supplies an alternating current to the transformer 42 through the electrical wire conductors 44. From the transformer 42, the alternating current is supplied to the induction heating coil 36 by electrical conductors 46. Specifically, the alternating current exits the transformer 42 through power connections 70 attached to a base 72 of the transformer 42. The electrical conductors 46 are coupled to the power connections 70, e.g., by soldering, brazing, or bolting. As mentioned above, in certain embodiments, the electrical conductors 46 may have a hollow core, thereby enabling a coolant to flow through the electrical conductors 46 and the induction heating coil 36 to regulate a maximum temperature of the induction heating coil 36. In other words, the electrical conductors 46 and the induction heating coil 36 may carry the alternating current and a coolant flow.

As shown, the transformer 42 is supported by a top plate 74 and a bottom plate 76. In certain embodiments, the top and bottom plates 74 and 76 may be formed from a ceramic or other electrically insulating material. The top and bottom plates 74 and 76 are further coupled to a metal, ceramic, or polymer frame 78. The metal, ceramic, or polymer frame 78 may be configurable such that a distance 80 between the workpiece 32 and the induction heating coil 36 can be adjusted. For example, the metal, ceramic, or polymer frame 78 may further be secured to a robotic manipulator 88 (e.g., see, FIG. 2) configured to move and guide the induction heating system 34 in multiple planes along the weld joint of the workpiece 32. Furthermore, the robotic manipulator 88 may be coupled to the control circuitry 62 of the induction power supply 38 such that the control circuitry 62 may regulate the movement and speed of the induction heating coil 36 and/or the entire induction heating system 34 relative to the workpiece 32.

The purpose of the induction heating coil 36 is to carry electrical current from the transformer 42 or induction power supply 38 to magnetically induce current in the part (e.g., the workpiece 32) which is to be heated. The induction heating coil 36 is essentially a direct electrical short circuit between the two poles of the transformer 42 or the induction power supply 38. If any damage occurs to the induction heating coil 36, it may quickly overheat at the damaged area and melt. In certain embodiments, the induction heating coil 36 may be a metal tube which has been bent or formed or fabricated into a shape which will heat the part (e.g., the workpiece 32). Water or other coolant flows through the interior of the induction heating coil 36 to keep the induction heating coil 36 from overheating. If the coolant reaches the boiling point such that a gas bubble is formed on the interior surface of the induction heating coil 36, that gas bubble forms a barrier which prevents the coolant from removing heat from that area of the coil interior surface. If not monitored, the induction heating coil 36 may be damaged by localized melting at the location of that bubble. For example, a small indentation or a bending of the induction heating coil 36 into a shape different that the original design shape, may cause turbulence in the flow or a stagnant area of coolant flow, which is a possible location for the coolant to heat to above the boiling point. Also, cold working of a metal will decrease the electrical conductivity of the induction heating coil 36 at the local area of deformation, which can cause that spot on the induction heating coil 36 to overheat.

The electrical conductivity property of the induction heating coil 36 is an important physical characteristic. Any resistance heating of the induction heating coil 36 will reduce the efficiency of the induction heating process. Energy which is used to resistance heat the induction heating coil 36 may then be lost to the coolant, and not available to heat the part (e.g., the workpiece 32). The electrical conductivity of a metal is reduced by bending or forming, and by alloying ingredients. The coil metal, if it is bent or formed during fabrication, will have the electrical resistance increased in that area of deformation. A lower strength metal will exhibit a lesser decrease in conductivity when deformed than a higher strength metal. So, the induction heating coil 36 may be fabricated from a pure or nearly pure metal in the lowest strength mechanical condition. Consequently, in certain embodiments, the induction heating coil 36 is protected from any bending or other mechanical damage.

Figure 4:
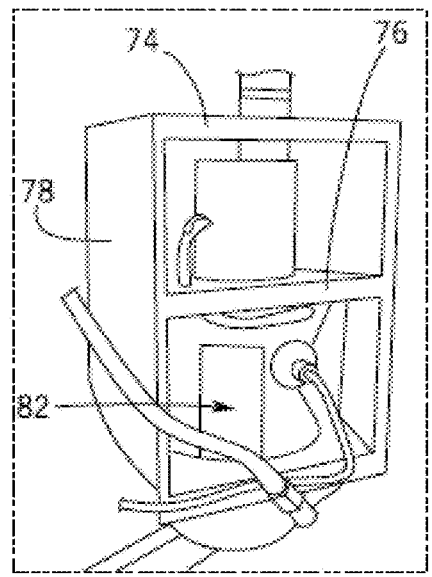
FIG. 4 is a perspective view of internal components on an embodiment of a hybrid induction heating/welding assembly, including an embodiment of a protective housing that entirely surrounds an induction heating coil, in accordance with aspects of the present disclosure.

In particular, as illustrated in FIG. 4, in certain embodiments, the induction heating coil 36 may be protected by using an outer sheath or structure as a coil protective housing 82. For example, in certain embodiments, the induction heating coil 36 may be entirely surrounded by the coil protective housing 82. Such a structure must not be electrically conductive to prevent heating by the induction heating coil 36. Higher strength polymer and ceramic materials may be used to prevent mechanical damage to the induction heating coil 36. Ceramic materials may be shaped prior to firing and polymer materials may be cast or machined to provide support to prevent damage to the induction heating coil 36. For example, in certain embodiments, the coil protective housing 82 may be a single piece, or a multiple piece structure. A multiple piece structure may be made from pieces which are all the same material, or may be made from a plurality of pieces, each of which can be different materials or the same materials. For example, in certain embodiments, the coil protective housing 82 may be made from two pieces of high density polypropylene, so the two pieces could be taken apart and easily removed and replaced. Additionally, if heat radiating from the heated part (e.g., the workpiece 32) is sufficient to cause damage to the coil protective housing 82, then multiple pieces may be used, where part of the coil protector housing 82 is made from a ceramic material that can withstand the heat near the heated part (e.g., the workpiece 32). Some ceramic materials are susceptible to heating by induction. In the case of the use of these types of ceramics, the ceramic material of the coil protective housing 82 may be shielded from the electromagnetic radiation generated by the passage of electrical current through the induction heating coil 36. In such embodiments, an electromagnetic flux concentrator material 84 may be placed between the induction heating coil 36 and the ceramic piece or pieces of the coil protective housing 82.

When the induction heating coil 36 is being used to produce a heated spot or heated line in the case of a thermal forming process, to produce a heated line ahead of the welding torch 16 in the case of hybrid induction arc welding, or to produce a heated line ahead of a cutting torch in the case of hybrid induction cutting, additional ceramic material may be added to further protect the induction heating coil 36 from the heat of the process. The choice of the material may depend on the specific properties of the material, such as wear resistance, resistance to erosion by flowing liquid metal or liquid metal oxides or other heated material, or resistance to the radiative heat of a welding arc or a plasma cutting arc. The susceptibility to heating by the induction heating coil 36 is a secondary material property while the wear, resistance to erosion, or the resistance to radiative heat from an arc (e.g., the welding arc 50) is the primary property upon which the material selection is made. Such ceramic components used to protect the induction heating coil 36 may, themselves, be protected from heating by the induction heating coil 36, by placement of flux concentrator material in the path of the radiated electromagnetic field produced by the induction heating coil 36 to prevent the electromagnetic field from affecting the ceramic material.

Figure 5:
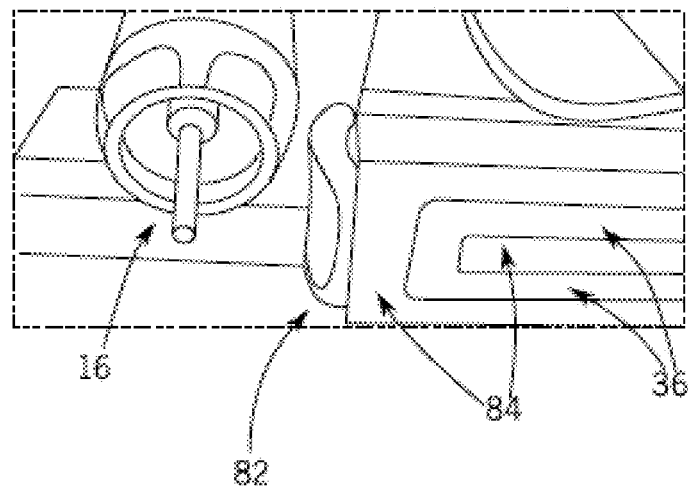
FIG. 5 is a perspective view of an embodiment of a protective housing that is disposed between an induction heating coil and a corresponding flux concentrator material and a welding torch, in accordance with aspects of the present disclosure.

For example, FIG. 5 illustrates an embodiment of an induction heating coil 36 with a ceramic coil protective housing 82 using the flux concentrator material 84 between the induction heating coil 36 and the ceramic coil protective housing 82. More specifically, as illustrated in FIG. 5, in certain embodiments, the flux concentrator material 84 may be disposed around the induction heating coil 36 The flux concentrator material 84 utilized to reduce or prevent wear and other degradation in this way may include materials that are heat resistant, non-metallic, wear resistant, and electrically insulating such as fiber reinforced materials, tempered glasses or composites.

Figure 6:
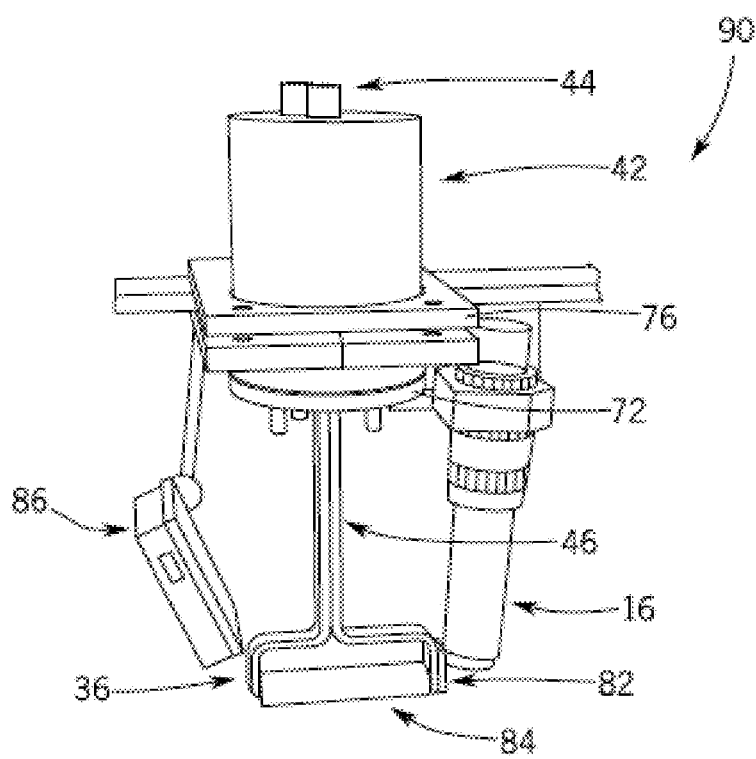
FIG. 6 is a perspective view of internal components of an embodiment of the hybrid induction heating/welding assembly, in accordance with aspects of the present disclosure.

Another method to prevent damage to the induction heating coil 36 is to sense that the induction heating coil 36 is likely to be damaged by collision, and to activate a motion device or multiple motion devices to prevent the collision and the damage. For example, as illustrated in FIG. 6, in certain embodiments, one or more sensors 86 may be used to protect the coil from collision and damage. For example, in certain embodiments, a laser height/distance sensor 86 (or other position-detecting sensor) may be used for sensing to prevent the induction heating coil 36 from colliding with a non-flat surface as it is moved along near the surface or to prevent the induction heating coil 36 from colliding with objects protruding from the surface.

As illustrated in FIG. 2, in certain embodiments, a robotic manipulator 88 or other mechanical motion system may be controlled by signals from the one or more sensors 86 to move the induction heating coil 36 to avoid collision with an object. It is also possible to use multiple laser distance sensors 86, or to have one or more laser distance sensors 86 pointing in different directions, or onto a curved surface at different locations, to provide data input to control circuitry (e.g., the control circuitry 54a, 54b, 62 of the welding power supply 12, the preheating power supply 200, and the induction power supply 38, respectively, or some other control circuitry of the system 10), and for the control circuitry 54a, 54b, 62 to control multiple robotic manipulators 88 or other mechanical motion systems to prevent collision with a curved surface, but to maintain a constant stand-off distance of the induction heating coil 36 from the surface. Alternative collision detection methods are possible, including a joint that detects a small degree of flexing. Reaching the small degree of flex, the motion may be stopped to prevent damage. In addition, sensing a higher than normal force in the system 10 may be used to sense a collision and stop the system 10 before damage occurs.

In addition, in certain embodiments, the control circuitry (e.g., the control circuitry 54a, 54b, 62 of the welding power supply 12, the preheating power supply 200, and the induction power supply 38, respectively, or some other control circuitry of the system 10) may control the multiple robotic manipulators 88 or other mechanical motion systems to independent control position, orientation, and/or movement of the welding torch 16 and the transformer 42 and/or the induction heat coil 36 relative to the workpieces 32 being worked on. For example, the robotic manipulators 88 or other mechanical motion systems may include independent positioning systems disposed within a common housing of the hybrid induction heating/welding assembly 90. More specifically, in certain embodiments, the independent positioning systems disposed within the common housing of the hybrid induction heating/welding assembly 90 may include multi-axis positioning systems configured to independently adjust the position, orientation, and/or movement of the welding torch 16 and the transformer 42 and/or the induction heat coil 36 relative to the common housing (and, thus, relative to the workpieces 32 being worked on. Accordingly, these multi-axis positioning systems form a part of the robotic manipulators 88 or other mechanical motion systems described herein.

If the induction heating coil 36 moves too far from the surface of the part (e.g., the workpiece 32) being heated by the induction heating coil 36, then the electromagnetic field coupling with the metal part will be reduced, and the energy transfer will be reduced. This condition may cause the induction heating coil 36 to overheat, and to potentially be damaged. In this instance, the one or more laser distance sensors 86 protect the induction heating coil 36 from overheating.

The hybrid induction heating/welding assembly 90 includes the one or more laser height sensors 86 to detect a distance (height) of the one or more laser height sensors 86 from a surface of the part being heated (e.g., the workpiece 32), whereby this distance may be used as a proxy for determining the position of the induction heating coil 36 from the surface of the part being heated (e.g., the workpiece 32). More specifically, the one or more laser height sensors 86 may be communicatively coupled to control circuitry (e.g., the control circuitry 54a, 54b, 62 of the welding power supply 12, the preheating power supply 200, and the induction power supply 38, respectively, or some other control circuitry of the system 10), and the control circuitry 54a, 54b, 62 may receive a signal from the one or more laser height sensors 86, and determine how to control operation of the hybrid induction heating/welding assembly 90 accordingly. For example, as described herein, the control circuitry 54a, 54b, 62 may control multiple robotic manipulators 88 or other mechanical motion systems to prevent collision of the induction heating coil 36 with the surface of the part being heated (e.g., the workpiece 32), and maintain a constant stand-off distance of the induction heating coil 36 from the surface of the part being heated (e.g., the workpiece 32).

In some examples, the hybrid induction heating/welding assembly 90 may include a separate laser height sensor module (e.g., disposed within a housing of the hybrid induction heating/welding assembly 90) that is communicatively coupled to the one or more laser height sensors 86, which may be configured to receive a signal from the one or more laser height sensors 86, and configured to control operation of the hybrid induction heating/welding assembly 90 accordingly. For example, the laser height sensor module may include its own control circuitry (e.g., one or more processors configured to execute code stored in one or more storage media, similar to the control circuitry 54a, 54b, 62 described herein) for determining a distance of the induction heating coil 36 from the surface of the part being heated (e.g., the workpiece 32), and for at least partially controlling operation of the hybrid induction heating/welding assembly 90 accordingly (e.g., either individually controlling or providing coordinated control with the control circuitry 54a, 54b, 62 of the welding power supply 12 and the induction power supply 38, respectively, or some other control circuitry of the system 10). For example, a laser height sensor module may be configured to send control signals to multiple robotic manipulators 88 or other mechanical motion systems to prevent collision of the induction heating coil 36 with the surface of the part being heated (e.g., the workpiece 32), and to maintain a constant stand-off distance of the induction heating coil 36 from the surface of the part being heated (e.g., the workpiece 32).

Additionally or alternatively, in some examples, the hybrid induction heating/welding assembly 90 may include an infrared temperature sensor module (e.g., disposed within a housing of the hybrid induction heating/welding assembly 90) that includes one or more infrared temperature sensors. The infrared temperature sensor module may be configured to control operation of the hybrid induction heating/welding assembly 90 accordingly. For example, an infrared temperature sensor module may include its own control circuitry (e.g., one or more processors configured to execute code stored in one or more storage media, similar to the control circuitry 54a, 54b, 62 described herein) for determining temperatures proximate the induction heating coil 36 and/or the surface of the part being heated (e.g., the workpiece 32), and for at least partially controlling operation of the hybrid induction heating/welding assembly 90 accordingly (e.g., either individually controlling or providing coordinated control with the control circuitry 54a, 54b, 62 of the welding power supply 12, the preheating power supply 200, and the induction power supply 38, respectively, or some other control circuitry of the system 10). For example, an infrared temperature sensor module may be configured to send control signals to the control circuitry 54a of the welding power supply 12, the control circuitry 54b of the preheating power supply 200, and/or the control circuitry 62 of the induction power supply 38 to adjust the welding and/or induction power supplied to the hybrid induction heating/welding assembly 90 by the welding power supply 12 and/or the induction power supply 38, to send control signals to control position, orientation, and/or movement of the hybrid induction heating/welding assembly 90 relative to the surface of the part being heated (e.g., the workpiece 32), to determine at least one of the welding heat profile or the induction heat profile in the workpiece 32, and so forth.

Although described as being a welding torch 16 being used for a hybrid induction arc welding process, in other embodiments, the welding torch 16 may instead be replaced by a plasma cutting torch being used for a hybrid induction cutting process, or other hybrid metal working and induction heating processes may be implemented using other types of metal working tools. Indeed, in certain embodiments, the welding torch 16 (and plasma cutting torches, etc.) may be removable and replaceable from the hybrid induction heating/welding assembly 90 (i.e., leaving the rest of the internal components of the hybrid induction heating/welding assembly 90 unchanged) such that different hybrid induction heating processes may be implemented by the hybrid induction heating/welding assembly 90 with relatively minimal effort.

Figure 7A:
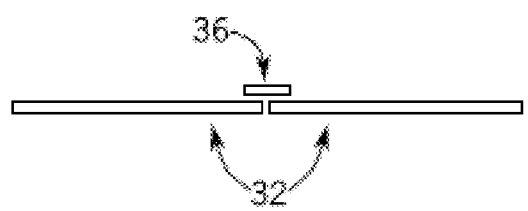
FIGS. 7A and 7B illustrate two induction heating coil configurations for butt joints, in accordance with aspects of the present disclosure.
Figure 7B:
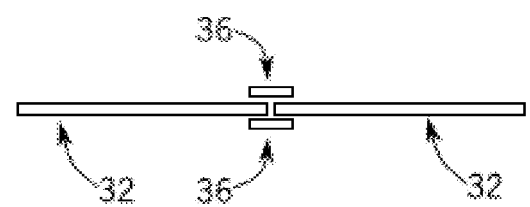
Figure 8A:
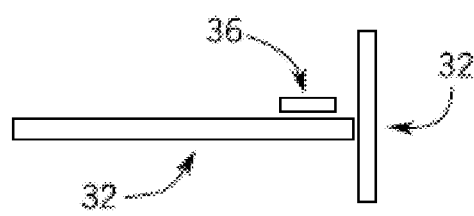
FIGS. 8A through 8H illustrate various induction heating coil configurations for T-fillet joints, in accordance with aspects of the present disclosure.
Figure 8B:
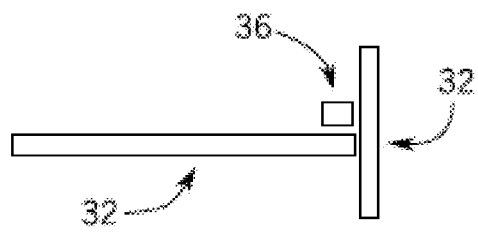
Figure 8C:
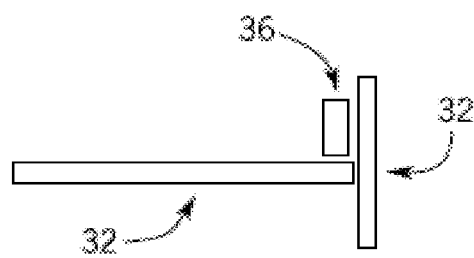
Figure 8D:
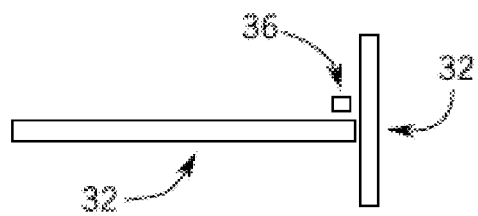
Figure 8E:
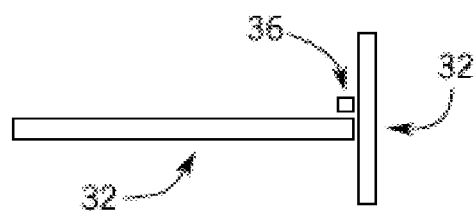
Figure 8F:
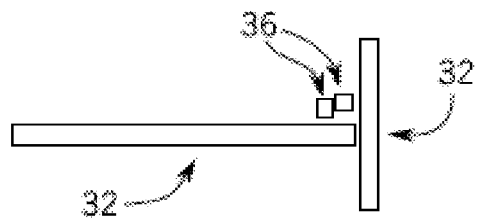
Figure 8G:
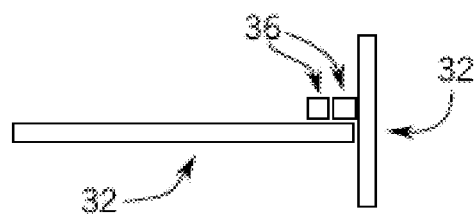
Figure 8H:
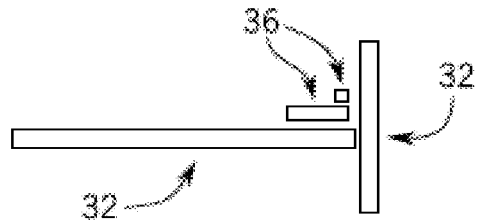

In addition to having removable and replaceable welding torches 16 and/or plasma cutting torches, etc., in certain embodiments, the induction heating coil 36 of the hybrid induction heating/welding assembly 90 may also be removable and replaceable. Indeed, in certain embodiments, multiple induction heating coils 36 may be installed into the hybrid induction heating/welding assembly 90 to facilitate different configurations of parts (e.g., workpieces 32) being welded, cut, formed, etc. For example, FIGS. 7A and 7B illustrate two induction heating coil 36 configurations for butt joints. As illustrated in FIG. 7A, in certain embodiments, a single induction heating coil 36 may be disposed on a first side of parts (e.g., workpieces 32) being welded. In other embodiments, a first induction heating coil 36 may be disposed on a first side of parts (e.g., workpieces 32) being welded, whereas a second (e.g., back side) induction heating coil 36 may be disposed on a second, opposite side (e.g., back side) of the parts (e.g., workpieces 32) being welded. FIGS. 8A through 8H illustrate various induction heating coil 36 configurations for T-fillet joints.

Figure 9A:
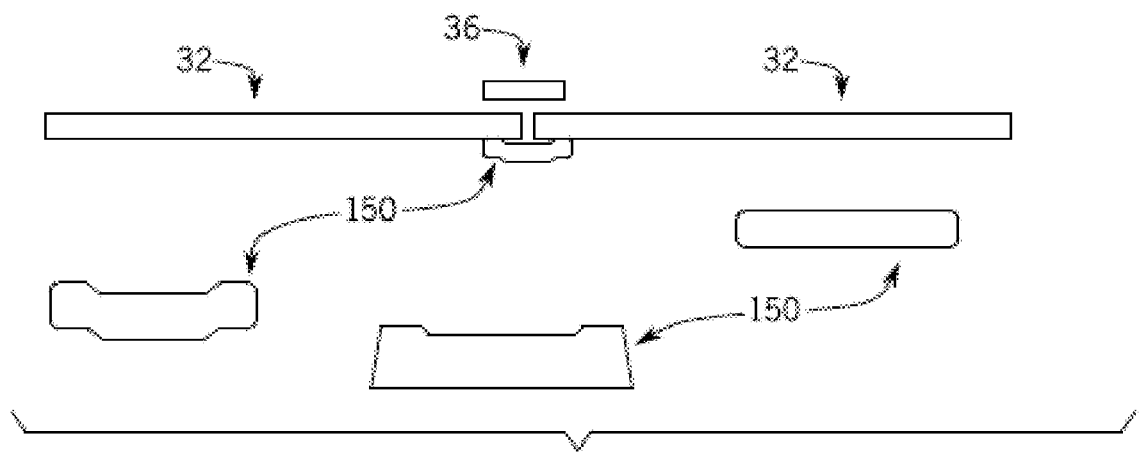
FIGS. 9A and 9B illustrate various shapes of a weld backing for use in butt joints and T-fillet joints, respectively, in accordance with aspects of the present disclosure.
Figure 9B:
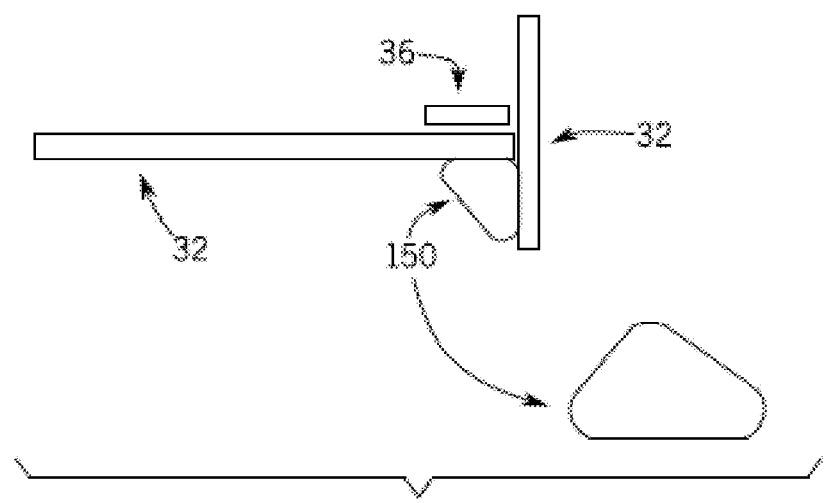

In certain embodiments, a weld backing 150 may be used in conjunction with the hybrid induction heating/welding assembly 90. More specifically, as illustrated in FIG. 9A, in the context of butt joints, the weld backing 150 may be disposed on a side of the parts (e.g., workpieces 32) being welded opposite from an induction heating coil 36 of the hybrid induction heating/welding assembly 90. FIG. 9A also illustrates various shapes of the weld backing 150 for use in butt joints. Similarly, as illustrated in FIG. 9B, in the context of T-fillet joints, the weld backing 150 may be disposed on a side of one of the parts (e.g., workpieces 32) being welded opposite from an induction heating coil 36 of the hybrid induction heating/welding assembly 90. FIG. 9B also illustrates an exemplary shape of the weld backing 150 for use in T-fillet joints. The weld backings 150 illustrated in FIGS. 9A and 9B may be made of a variety of materials including, but not limited to, copper, water-cooled copper, ceramic, powdered flux, fiberglass, woven fiber glass cloth, and so forth.

Figure 10A:
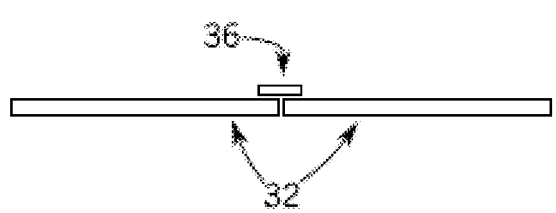
FIGS. 10A and 10B illustrate a coil standoff distance between the induction heating coil(s) of the hybrid induction heating/welding assembly and the surface of workpieces, in accordance with aspects of the present disclosure.
Figure 10B:
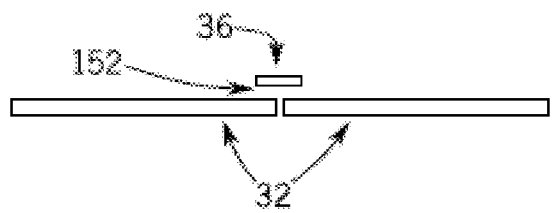
Figure 11A:
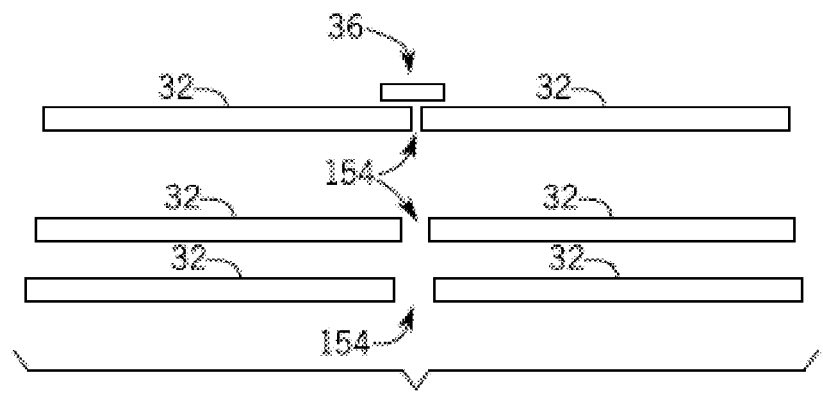
FIGS. 11A and 11B illustrate various weld gap distances between workpieces for butt joints and T-fillet joints, respectively, in accordance with aspects of the present disclosure.
Figure 11B:
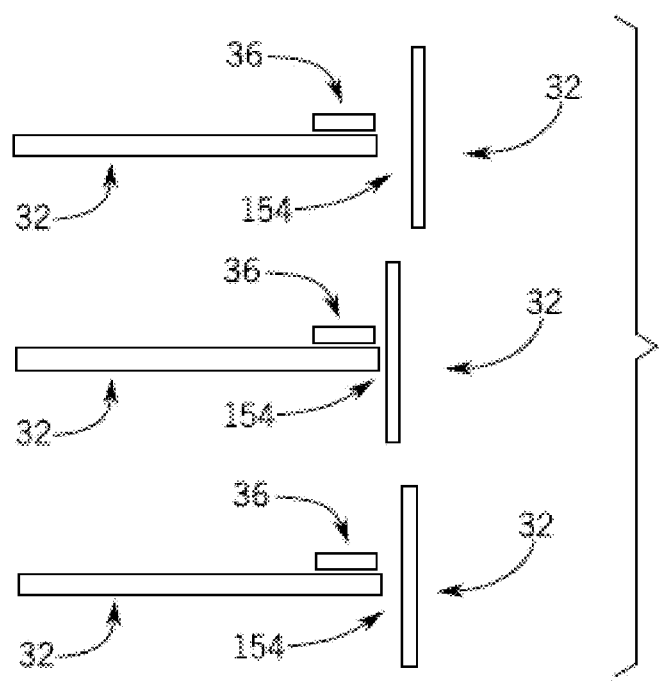

As described herein, the hybrid induction heating/welding assembly 90 may include various sensors and/or sensor modules configured to detect operational parameters of the hybrid induction heating/welding assembly 90 (e.g., position, orientation, and/or movement of the induction heating coil(s) 36 of the hybrid induction heating/welding assembly 90 relative to a surface of the workpiece(s) 32, air and/or coolant flow rates and/or temperatures, welding power, induction heating power, and so forth), and to send signals to control circuitry (e.g., the control circuitry 54a, 54b, 62 of the welding power supply 12, the preheating power supply 200, and the induction power supply 38, respectively, or some other control circuitry of the system 10) for the purpose of adjusting the operational parameters. For example, as illustrated in FIGS. 10A and 10B, in certain embodiments, the distance 152 between the induction heating coil(s) 36 of the hybrid induction heating/welding assembly 90 and the surface of the workpieces 32 (referred to as the "coil standoff distance") may be continually adjusted, for example, by the one or more robotic manipulators 88 or other mechanical motion systems described herein (see, e.g., FIG. 2) based at least in part on feedback from the various sensors and/or sensor modules of the hybrid induction heating/welding assembly 90. In addition, as illustrated in FIGS. 11A and 11B, in certain embodiments, the distance 154 between workpieces 32 (referred to as "weld gap distance") may be continually adjusted, for example, by the one or more robotic manipulators 88 or other mechanical motion systems described herein (see, e.g., FIG. 2) based at least in part on feedback from the various sensors and/or sensor modules of the hybrid induction heating/welding assembly 90.

The hybrid induction and welding systems and methods described herein reduce total heat applied to a workpiece, speed up the process so that, for example, the weld and base metal do not have added heat per unit length of weld, improve deposition rates, and/or reduce workpiece distortion and distortion-related problems. By utilizing the induction heat to raise the surfaces of the weld joint up to a higher temperature, or even near melting, the heat of the welding arc can be utilized to melt the wire, and the process can run at much higher travel speed than conventional welding. The arc can be mostly contained in a narrow weld joint gap, thus much less of the arc energy is lost to the surrounding environment, resulting in much more efficient use of the energy in the arc plasma. Welding defects, which require labor and materials, as well as schedule time, are reduced, thus resulting in higher overall productivity. Moreover, when using conventional welding techniques, narrow gap welding is a problem using only the welding arc for heat—gaps need to be fairly wide, and generally need to be wider at the top to accommodate the welding arc. With the improved hybrid induction metal working processes described herein, a much narrower gap can be used, because the arc can easily melt into the weld edges, which are already closer to the melting point, rather than having to machine or grind the weld joint to open the top.

Productivity is also increased because the narrow gap results in a reduced use of consumables. The volume of metal needed to fill the weld joint gap is supplied by the melted welding wire. A narrower gap will, necessarily, reduce the welding wire consumption—essentially replacing what, using conventional welding gaps, would have been expensive welding wire with the much less expensive base metal of the parts (e.g., the workpieces 32) being joined. A narrow gap reduces the amount of shielding gas or flux as well. Consequently, productivity, which may be expressed as a measure of the ratio of length of weld produced per unit cost, is increased. Additionally, the wear and damage to the welding torch 16, particularly the replacement parts, is generally measured by the total "arc-on" time. The added speed of the process, reduces the amount of time the arc is on, thus reducing the wear and damage to the welding torch 16, as well as the wire feeder. This is also true of the use of energy—as an energy radiator, the arc plasma losses to the surrounding environment can be 30-50 percent. Induction heating is generally 8 percent or less energy lost—resulting in additional improvement in productivity.

As used herein, the term narrow gap is intended to encompass gaps characterized by relatively similar widths between the workpieces 32 at the top and bottom of the workpieces 32, respectively. For example, in certain embodiments, the width between the workpieces 32 at the top of the workpieces 32 may only be approximately 10-75% larger than the width between the workpieces 32 at the bottom of the workpieces 32, which may lead to a relatively low angle of the narrow gap of approximately 10°-approximately 25°, approximately 1°-approximately 10°, approximately 0°-approximately 5°, approximately 0°-approximately 2.5°, or even lower. Indeed, in certain embodiments, the width between the workpieces 32 at the top of the workpieces 32 may be substantially similar (e.g., within 0-5%) to the width between the workpieces 32 at the bottom of the workpieces 32, which may lead to an angle of the narrow gap of approximately 0° (e.g., less than approximately 1°, less than approximately 0.5°, and so forth). It will be appreciated that other, less narrow, angles (e.g., approximately 35°-approximately 45°) may also benefit from the embodiments described herein.

Figure 12:
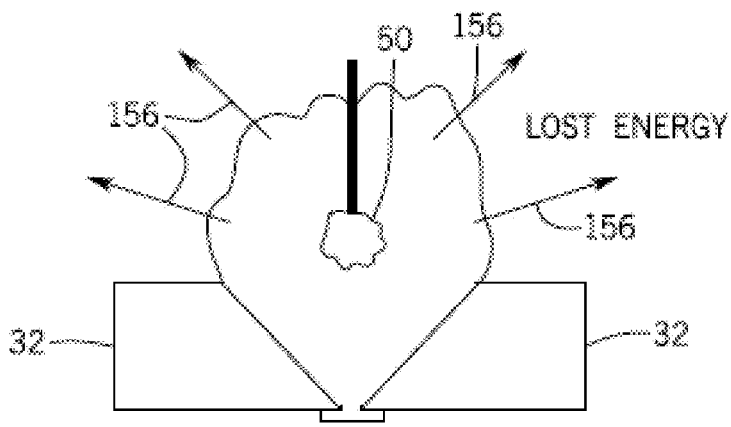
FIG. 12 illustrates a conventional welding operation in which a V-joint profile is used, with the consequent loss of energy from the welding arc.

Because of various constraints on the welding arc available energy level, weld joints, particularly in joining thicker metal, are cut, ground, or machined to have a profile larger at the surface closest to the welding arc. Industry statistics show that more time, perhaps as much as double, is needed to set-up a cutting machine to produce such a beveled weld joint profile or a V-joint profile. FIG. 12 illustrates a conventional welding operation in which a V-joint profile is used, with the consequent loss of energy 156 from the welding arc 50. Even more time and cost is spent creating other types of weld joint profiles, such as J-grooves or U-grooves, with similar consequent energy loss.

Figure 13:
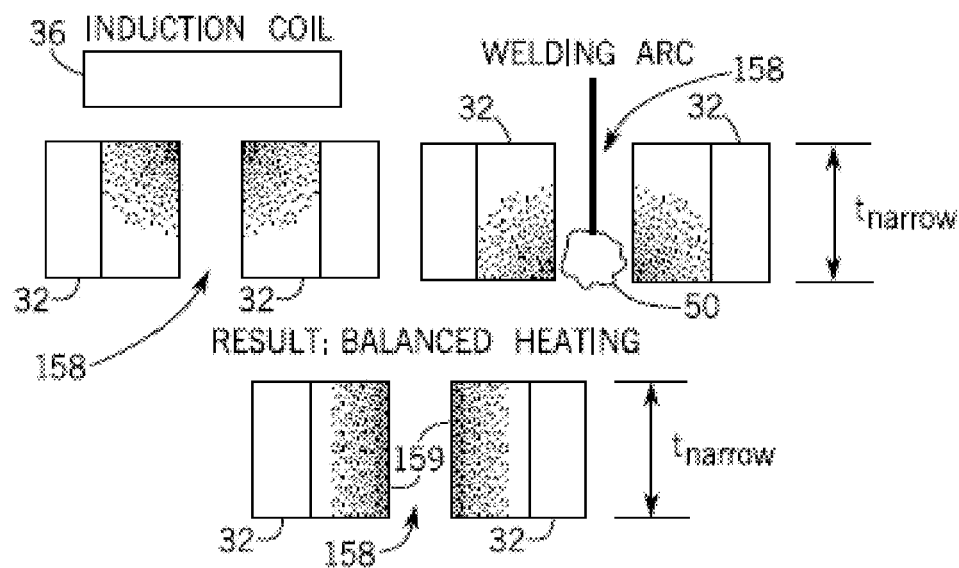
FIG. 13 illustrates how the application of induction heating and arc heating may be combined for balanced heating in a narrow gap weld, in accordance with aspects of the present disclosure.

FIG. 13 illustrates a welding process (a GMAW welding process, for example) in which a generally straight narrow gap 158 is provided between workpieces 32 to be joined. In particular, in the illustrated embodiment, the inner (e.g., mutually facing) surfaces 159 of the narrow gap 158 may be substantially parallel to each other (e.g., within 5°, within 2°, within 1°, or even less). An induction heating coil 36 is utilized to heat the workpieces 32. The heat profile of the welding arc 50 and the electrode preheating is generally balanced with the induction heat profile to provide a more balanced heat profile in the narrow gap 158. More specifically, as illustrated in FIG. 13, due to the positioning of induction heating coil 36 and the welding torch 16 with respect to the workpieces 32 (which, again, may be actively controlled by the control circuitry described herein), the combination of the induction heat profile generated by the induction heating coil 36 and the welding heat profile generated by the welding torch 16 may be balanced (e.g., substantially evenly distributed) throughout the entire thickness $t_{narrow}$ of the straight narrow gap 158 formed between the workpieces 32. For example, in certain embodiments, the heat generated on the inner surfaces 159 of the workpieces 32 may vary by less than 15%, less than 10%, less than 5%, less than 2%, and so forth, along the inner surfaces 159. Welds have been produced with the hybrid induction welding processes described herein of zero width square butt weld joint gap. The process has been shown to make acceptable welds with a gap 158 as large as 0.125". It appears feasible to produce welds with gaps 158 as large as 0.375" or larger, however, the primary benefit in productivity is gained from as narrow of a gap 158 as possible (e.g., less than approximately 0.375", less than approximately 0.125", and so forth).

It will be appreciated that the balancing between the heat profile generated by the welding arc 50 and the electrode preheating, and the induction heat profile generated by the induction heating coil 36 may be actively controlled by the control circuitry 54a, 54b, 62 of the welding power supply 12, the preheating power supply 200, and the induction power supply 38, or some other control circuitry of the system 10. For example, the control circuitry 54a of the welding power supply 12, the control circuitry 54b of the preheating power supply 200, the control circuitry 62 of the induction power supply 38, or some other control circuitry of the system 10, may receive signals relating to detected operational parameters of the hybrid induction heating/welding assembly 90 from the various sensors and/or sensor modules described herein, and may determine (e.g., estimate) the heat profile generated by the welding arc 50 and the electrode preheating, and/or the induction heat profile generated by the induction heating coil 36. The example control circuitry 54a, 54b, 62 determines a combined heat profile (e.g., a combination of the estimated heat profile and the estimated induction heat profile) by combining the welding heat profile and the induction heat profile.

In some examples, the control circuitry 54a of the welding power supply 12, the control circuitry 54b of the preheating power supply 200, the control circuitry 62 of the induction power supply 38, or some other control circuitry of the system 10, may control the welding current, the preheating current, or the induction heat based on a target heat input to the workpiece 32.

The control circuitry 54a of the welding power supply 12 and/or the control circuitry 54b of the preheating power supply 200 may control the welding power (e.g., welding current and/or welding voltage applied to the electrode wire 208 via the first contact tip 202) and/or the preheating power (e.g., preheating current and/or preheating voltage applied to the section 214 of the electrode wire 208 via the contact tips 202, 204) based on heating of the workpiece 32 by the induction heating coil 36. For example, the control circuitry 54a, 54b may adjust the welding power and/or the preheating power based on induction heating power provided to the induction heating coil 36 and/or based on a temperature of the workpiece 32 sensed by a temperature sensor following heating by the induction heating coil 36.

In some examples, the electrode preheating circuit (e.g., the preheating power supply 200, the contact tips 202, 204, etc.) is configured to reduce cast in the electrode wire 208 via the preheating power, prior to the electrode wire 208 exiting the first contact tip 202. For example, by preheating the electrode wire 208 to a threshold temperature, stresses present in the electrode wire 208 as cast are reduced or removed prior to the electrode wire 208 reaching the arc 50. Example techniques to reduce cast in the electrode wire 208 are disclosed in U.S. patent application Ser. No. 15/703,008, filed Sep. 13, 2017, entitled "SYSTEMS, METHODS, AND APPARATUS TO REDUCE CAST IN A WELDING WIRE." The entirety of U.S. patent application Ser. No. 15/703,008 is incorporated herein by reference.

In some example systems, the control circuitry 54a, 54b determines a change in a contact-tip-to-work-distance of the welding torch 16 based on the welding current and/or the preheating current. Based on the determined change in the contact-tip-to-work distance, the example control circuit 54b may adjust the preheating current or a wire feed speed. Examples to determine the change in contact-tip-to-work distance and adjust the preheating current and/or wire feed speed based on the change are disclosed in U.S. patent application Ser. No. 15/618,926, filed Jun. 9, 2017, entitled "Systems, Methods, and Apparatus to Control Welding Electrode Preheating." The entirety of U.S. patent application Ser. No. 15/618,926 is incorporated herein by reference.

In some examples, the control circuit 54b of the preheating power supply 200 receives feedback representative of a preheating voltage (e.g., a voltage between the contact tips 202, 204, or a voltage across the section 214 of the electrode wire 208). For example, a preheating feedback circuit 224 may be used to measure the voltage between the contact tips 202, 204 and provide the measurement to the preheating power supply 200. Based on the preheating voltage, the example control circuit 54b controls the preheating current based on the preheating voltage and/or controls the electrode preheating circuit to adjust the preheating current in response to detecting an invalid preheat voltage measured by the preheating feedback circuit 224. An example invalid preheat voltage may be a preheat voltage that is either undefined by the preheat voltage feedback control circuit or that falls outside of a specified valid range of voltages, such as less than a threshold voltage. Example techniques for detecting the preheating voltage and/or controlling the preheating based on the preheating voltage are disclosed in U.S. patent application Ser. No. 15/490,169, filed Apr. 18, 2017, entitled "Systems, Methods, and Apparatus to Provide Preheat Voltage Feedback Loss Protection." The entirety of U.S. patent application Ser. No. 15/490,169 is incorporated herein by reference.

In some examples, the control circuit 54a, 54b controls the electrode preheating circuit based on an input specifying one or more preheating parameter(s) (e.g., via the user interface 20). The preheating parameter comprises at least one of the preheating current, a preheating voltage, preheating wattage, impedance, an electrode temperature, a power balance between the preheating wattage and arc wattage, a total heat input to the weld, a preheating enthalpy, a penetration value, a workpiece thickness, a wire diameter of the electrode wire 208, a joint type of the workpiece, or a material type of the workpiece. In some examples, the control circuit 54a, 54b controls welding parameter(s) and/or induction heating parameter(s) based on the preheating parameter(s). For example, an operator may specify one or more preheating parameters, and the control circuits 54a, 54b, 60 control welding parameter(s) and/or induction heating parameter(s) based on the preheating parameter(s).

As an example, the control circuit 54b of the preheating power supply 200 may instruct the welding power supply 12 and/or the induction power supply 38 to reduce power output in response to a user input increasing preheating power. Techniques for controlling the electrode preheating circuit and/or the welding power supply 12 are disclosed in U.S. patent application Ser. No. 15/596,387, filed May 16, 2017, entitled "Systems, Methods, and Apparatus to Preheat Welding Wire." The entirety of U.S. patent application Ser. No. 15/596,387 is incorporated herein by reference.

The electrode preheating circuit may reduce diffusible hydrogen present in the electrode wire 208. Reducing diffusible hydrogen may substantially reduce the risk of hydrogen cracking in, for example, high-strength steel welding applications. Techniques that may be used to implement the welding power supply 12 and/or the preheating power supply 200 are disclosed in U.S. Provisional Patent Application No. 62/517,507, filed Jun. 9, 2017, entitled "SYSTEMS, METHODS, AND APPARATUS TO PREHEAT WELDING WIRE FOR LOW HYDROGEN WELDING." The entirety of U.S. Patent Application Ser. No. 62/517,507 is incorporated herein by reference.

In some examples, the control circuits 54a, 54b, 60 may control at least one of the welding current, the preheating current, or the induction heat based on a travel speed of the at least one induction heating coil 36 and/or the welding torch 16 relative to the workpiece 32.

The control circuitry 54a, 54b, 62 may adjust one or more operational parameters based on the welding heat profile, the induction heat profile, and/or the combined heat profile, for example, balance the heat profile generated by the welding arc 50 and the induction heat profile generated by the induction heating coil 36. In some examples, balancing the combined heat profile reduces (e.g., minimizes) distortion and/or stresses in the workpieces 32. For example, in certain embodiments, the positioning of the welding torch and/or the induction heating coil(s) 36 relative to the workpieces 32 may be continually adjusted, for example, by the one or more robotic manipulators 88 or other mechanical motion systems described herein (see, e.g., FIG. 2) based at least in part on algorithms executed by the control circuitry 54a of the welding power supply 12, the control circuitry 54b of the preheating power supply 200, the control circuitry 62 of the induction power supply 38, or some other control circuitry of the system 10, to determine (e.g., estimate) the heat profile generated by the welding arc 50 and the electrode preheating, and/or the induction heat profile generated by the induction heating coil 36 based at least in part on the feedback from the various sensors and/or sensor modules of the hybrid induction heating/welding assembly 90, and then determine the combined heat profile (e.g., a combination of the estimated heat profile generated by the welding arc 50 and the electrode preheating and the estimated induction heat profile generated by the induction heating coil 36).

Side wall fusion defects are common in narrow gap welding with conventional arc welding processes. Defect repairs are costly in materials and labor as well as causing production scheduling delays and, thus, are a significant detriment to productivity. Because of the balanced heating generated by the combination of an independently controlled induction heating coil(s) 36 and an arc plasma (e.g., generated by the welding torch 16), sidewall fusion defects are reduced or eliminated.

Although the use of a single induction heating coil 36 may be the simplest application of the hybrid induction welding processes described herein, multiple induction heating coils 36 may be used to further increase productivity. In particular, in certain embodiments, a single wide induction heating coil 36 can span the weld joint gap, simultaneously heating both sides (see, e.g., FIG. 14A). Conversely, in other embodiments, dual parallel induction heating coils 36 on both sides of the weld joint gap can be used to double the induction heating and, with an increase in the welding arc wire feed speed and power level, to double the welding speed or more than double the welding speed (see, e.g., FIG. 14B).

Figure 15A:
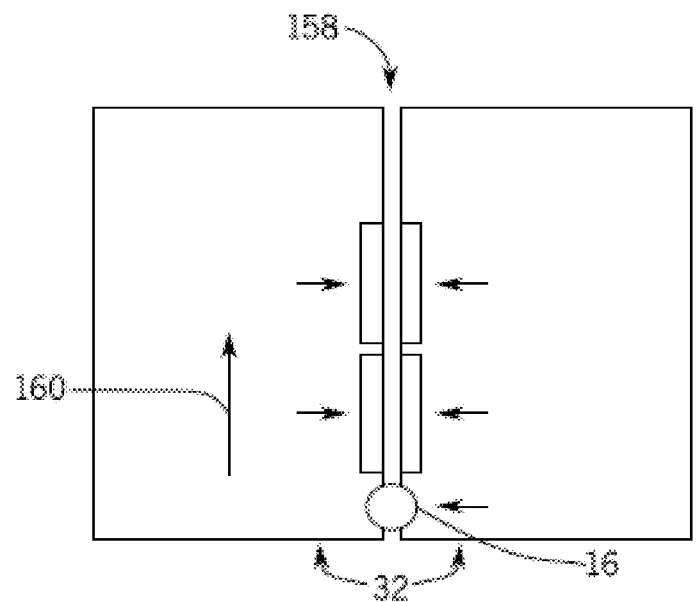
FIGS. 15A and 15B illustrates various configurations for multiple induction heating coils, in accordance with aspects of the present disclosure.
Figure 15B:
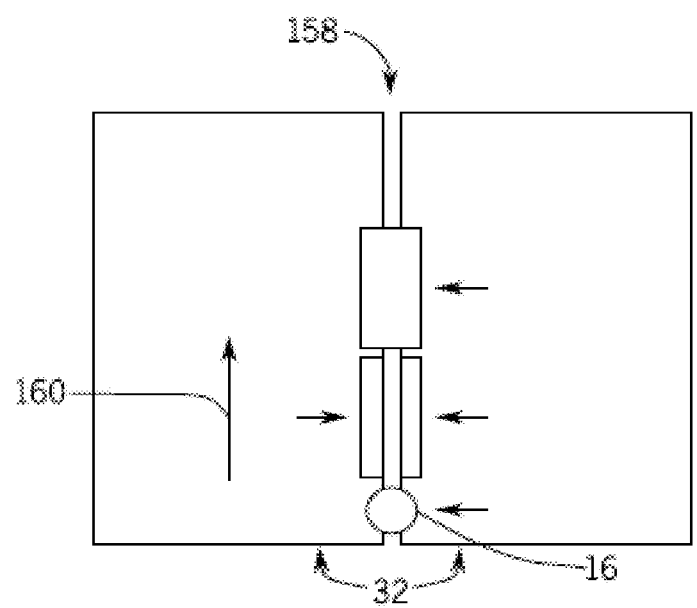

Multiple induction heating coils 36 can also be used in series in certain embodiments. For example, two relatively wide induction heating coils 36, one in front of the other ahead of the welding torch 16 along the weld seam may be used to double the induction power. In addition, as illustrated in FIG. 15A, in certain embodiments, multiple sets of parallel induction heating coils 36 may be used in series to quadruple the induction heating power. Furthermore, as illustrated in FIG. 15B, in other embodiments, other combinations of induction heating coils 36, such as two parallel induction heating coils 36 placed in series with a single wide induction heating coil 36 further ahead in the direction of welding 160 (e.g., further in front of the welding torch 16) may be used.

Multiple orientations are possible including placing the induction heating coil(s) 36 on the back side of the weld, or positioned to favor the direction for desired penetration, or positioned as dictated by access limitations. The finished weld profile (cross-section) shows that the melted material favors the area with induction heating. Therefore, positioning of the induction heating coil(s) 36 relative to the joint adds another level of control to influence the penetration profile of a finished weld or the preferred direction of a cutting process. For example, in the case of joining a thicker member to a thinner member, induction heating may be used to ensure adequate penetration on the thick member without excessive heat on the thinner member. This process may allow for joints that were too difficult in the past using conventional processes. Further, weld penetration will favor where the material is already heated. Thus, by strategically placing the induction heating, the finished weld penetration location, depth, width, or other critical cross-section metrics may be optimized.

There are no restrictions of the type of weld shielding gases that may be used for hybrid induction arc processes which may be gas shielded. All of the standard weld shielding gasses should be capable of providing shielding for the hybrid induction arc welding processes described herein. The process provides an opportunity to create new gas mixtures that enhance hybrid induction arc welding, but which may not be suitable for conventional arc welding processes. For example, a welding gas containing a mixture of argon and helium in higher proportions of helium could be used, to enhance the arc characteristics. In an ordinary welding process with a weld joint gap that is wider at the top, gas mixtures that contain higher percentages of low-density gases will tend to separate and the low-density gas can easily escape through the wide gap opening. For example, in an argon/helium mixture, the argon would tend to concentrate in the bottom of the weld joint and the helium at the top of the weld joint. For conventional GMAW processes, the highest level of helium in a shielding gas is 75 percent, however, for the hybrid induction heating processes described herein, a shielding gas with 75 to 95 percent helium would provide a hotter arc with excellent sidewall wetting to prevent defects from forming. Helium is more expensive than argon, but the very narrow weld joint gap constrains the width of the volume of gas needed, and the use of a lower cost leading gas and trailing gas will constrain the shielding gas to a small volume, thereby reducing the cost and increasing the productivity as a measure of cost per unit length of weld. Other welding gas mixtures can be used with the hybrid induction arc welding processes described herein, which would generally not be used for conventional gas shielded welding processes. For example, a gas mixture of approximately 17% argon (e.g., in a range of approximately 15-20% argon) and approximately 83% helium (e.g., in a range of approximately 80-85% helium) could be used for the hybrid induction arc welding (or cutting) processes described herein.

The hybrid induction arc welding (or cutting) processes described herein may utilize a travel speed that is faster than regular metal fabrication processes. Therefore, conventional gas delivery mechanisms may not be adequate. For example, conventional processes primarily use one gas flow nozzle (e.g., for delivery of the shielding gas from the gas source 22). In contrast, the system 10 described herein may require leading, main, and trailing gas nozzles. With the additional delivery locations, the gas combustion at each location may be optimized for a particular purpose such as heat, surface tension, purging the area of nitrogen, stirring action, process dynamics, and so forth.

Figure 16:
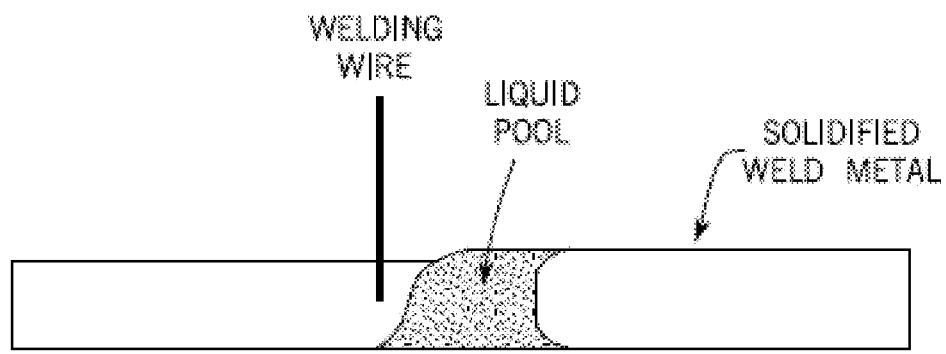
FIG. 16 illustrates a narrow gap weld being performed using the hybrid induction arc welding processes in accordance with aspects of the present disclosure.

In a conventional gas shielded arc welding process, once the welding arc has been completed, the plasma terminates into a liquid metal pool. Conversely, with the hybrid induction arc welding processes described herein, the narrow gap 158 is completely filled with the arc 50 such that arc forces keep the liquid metal out of that area of the weld joint gap, essentially creating a dam which holds back a "river" of liquid metal, as illustrated in FIG. 16. As the welding torch 16 moves along the joint, the liquid metal fills in behind the welding arc 50. In order to obtain good sidewall fusion, it is important that a thin film of liquid metal remain coating the weld joint gap sides. Consequently, a shielding gas component which, when in contact with the liquid metal, reduces the surface energy of the liquid metal pool, will tend to promote the uniform coating of the surface of the weld joint gap with liquid metal. This is because if a gap occurs in the liquid metal coating, it will create a higher energy surface, so the liquid metal will stretch to maintain coverage of the solid metal surface. The tendency to minimize surface energy is a defining factor in the morphology and composition of surfaces and interfaces. In general, wetting of a surface by a liquid is promoted if the liquid surface energy with the surrounding environment is lower than that of the solid metal surface. A gas mixture containing a gas which lowers the surface energy of the liquid will, thus, promote the coating of the metal surface with liquid metal. For example, the presence of only 50 ppm sulfur in liquid iron will reduce the surface tension by approximately 20%. Sulfur hexafluoride is a relatively dense gas that is nonreactive and nontoxic, and used as a propellant for aerosol delivery of liquid products. Therefore, a gas mixture of approximately 17% argon (e.g., in a range of approximately 15-20% argon), approximately 82.5% helium (e.g., in a range of approximately 80-85% helium), and approximately 0.5% sulfur hexafluoride (e.g., in a range of approximately 0.1-1.0% sulfur hexafluoride), for example, could be used to promote the wetting of the sides of the weld joint gap, and prevent sidewall fusion defects.

There are no restrictions of the type of welding wire that can be used with the hybrid induction arc welding processes described herein. However, powdered metal core wires tend to produce a welding arc 50 with a more uniform diameter, which will provide even more heat distribution from the arc plasma. Since the hybrid induction arc welding processes described herein do not require as much energy from the arc 50 to heat the base material (e.g., the workpiece(s) 32), the wire may be optimized to apply more of the energy to melt the wire. For example, solid wire that is more resistive, or a metal core wire whose outer sheath is more resistive (by thickness or alloy) may be used such that the wire is more easily melted.

Certain exemplary wire/gas compositions that have been shown to produce high quality welds at maximum speeds with the hybrid induction arc welding processes described herein include, for example: (1) using an iron alloy wire with a composition shown in Table 1 below, and using an approximately 17% argon/approximately 83% helium gas mixture, (2) using an iron alloy wire with the composition shown in Table 1 below, and using an approximately 17% argon/approximately 82.5% helium/approximately 0.5% sulfur hexafluoride gas mixture, and (3) using an iron alloy wire with the composition shown in Table 1 below, and using an approximately 10% carbon dioxide/approximately 90% argon gas mixture.

TABLE 1

Weld Metal Analysis

| | |
|---|---|
| Carbon (C) | 0.03 |
| Manganese (Mn) | 1.57 |
| Silicon (Si) | 0.69 |
| Phosphorus (P) | 0.001 |
| Sulphur (S) | 0.006 |

Figure 17:
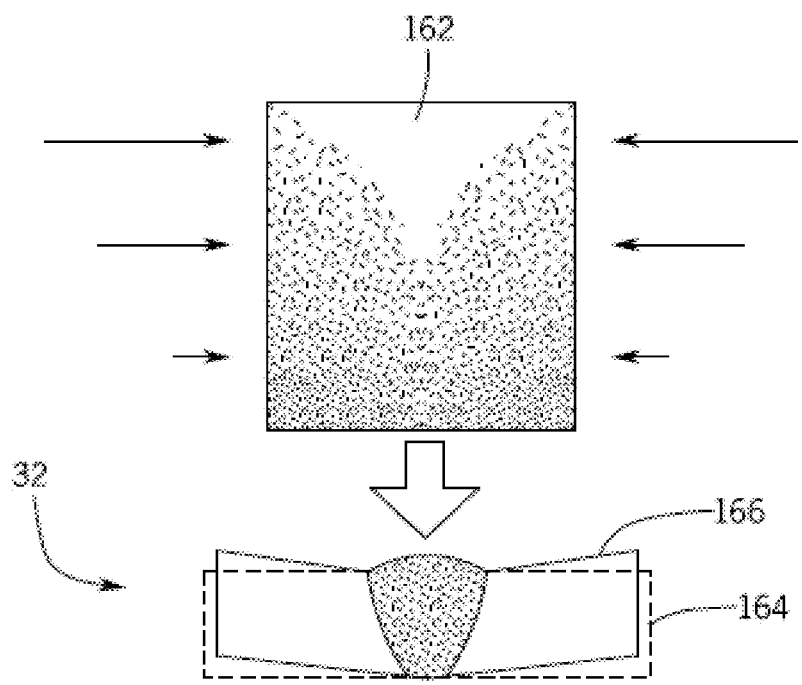
FIG. 17 illustrates a non-uniform heat profile that may be generated by a conventional butt welding arc, and the distortion of a workpiece from its original shape to a distorted shape.

Weld distortion is caused when the heat in a weld is not uniformly distributed. When the metal cools, it contracts, proportionately to the temperature of the metal (see FIG. 12). For arc welding, the electric arc radiates thermal energy. The portions of the weld which are closer to the arc receive more heat than the metal on the opposite side of the weld from the arc. As the weld cools, the hotter regions shrink more than the cooler regions. This causes non-uniform thermal stresses to develop in the weld. Non-uniform thermal stresses cause the metal to distort from the original size of the part before the welding process occurred. FIG. 17 illustrates the non-uniform heat profile 162 that may be generated by a conventional welding arc, and the distortion of a workpiece from its original shape 164 to a distorted shape 166.

Figure 18:
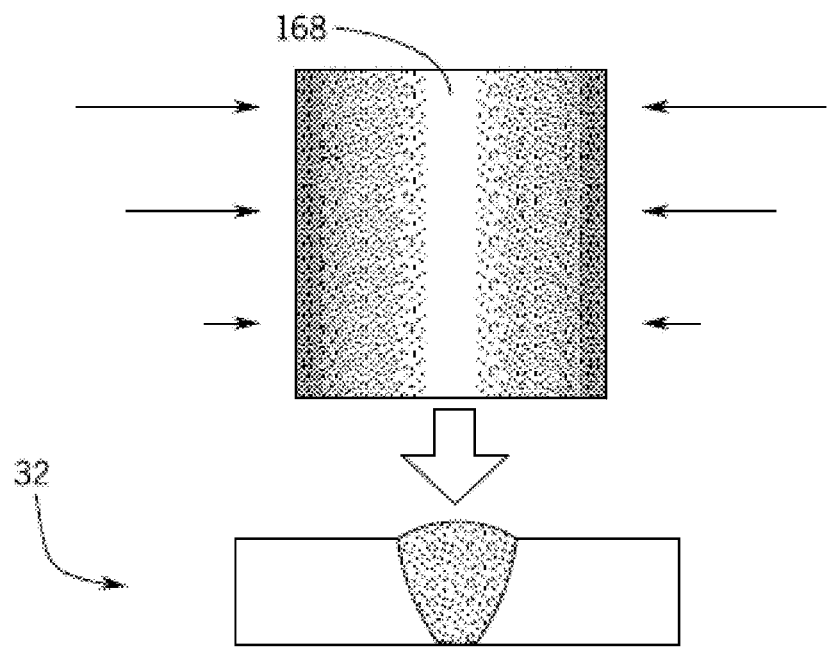
FIG. 18 illustrates a uniform heat profile that may be generated in a butt weld using the hybrid induction arc welding processes in accordance with aspects of the present disclosure.

The hybrid induction arc welding process described herein utilizes three independent heat sources (e.g., the heat profile generated by the welding arc 50, the electrode preheating, and the induction heat profile generated by the induction heating coil 36), to balance the heat distribution in the weld. The resulting thermal profile, with uniform heating, provides a weld which shrinks uniformly and does not generate non-uniform thermal stresses. At least one high-frequency induction coil 36 is placed near the welding torch 16. The induction coil 36 heats the top of the weld up to near the melting point of the workpiece(s) 32 (e.g., greater than 50% homologous temperature). As used in the present disclosure, the "homologous temperature" of a material refers to the ratio of the actual temperature of the material to the melting temperature of the material, both expressed in absolute temperature terms (e.g., degrees Kelvin). Then, following the induction coil 36, the arc welding process is applied by the welding torch 16 in such a way that the bottom of the weld is heated (see, e.g., FIG. 13). The resulting thermal profile is uniform heating through the weld. The weld then does not develop non-uniform thermal stresses, and the weld shrinkage is uniform through the weld. The uniform thermal stresses do not distort the weld (contrast the uniform heat profile 168 of FIG. 18 with the non-uniform heat profile 162 of FIG. 17).

Figure 19:
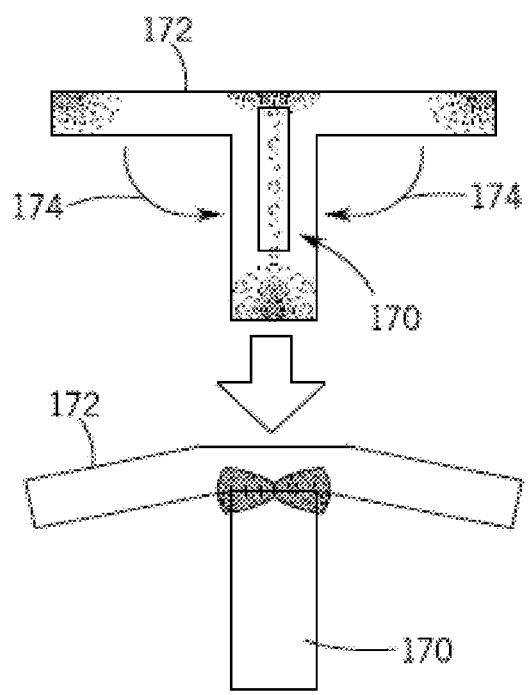
FIG. 19 illustrates a heat profile that may be generated by a conventional T-fillet welding arc, and the distortion of a workpiece from its original shape to a distorted shape.

Similar heat patterns can be developed to prevent distortion from occurring in other weld joint designs. For example, for T-fillet joints the distortion mechanism is different than for butt joints. In a T-fillet joint, the arc plasma of the welds heats the surface of the discontinuous member, but the center column of metal is still cool. The result is that the cool center column in the bottom member 170 remains relatively fixed, while the heated metal of the surfaces of the top member 172 and the weld metal itself cools and shrinks. This causes the top member 172 to bend toward the weld, as illustrated by arrows 174 (see FIG. 19).

Figure 20:
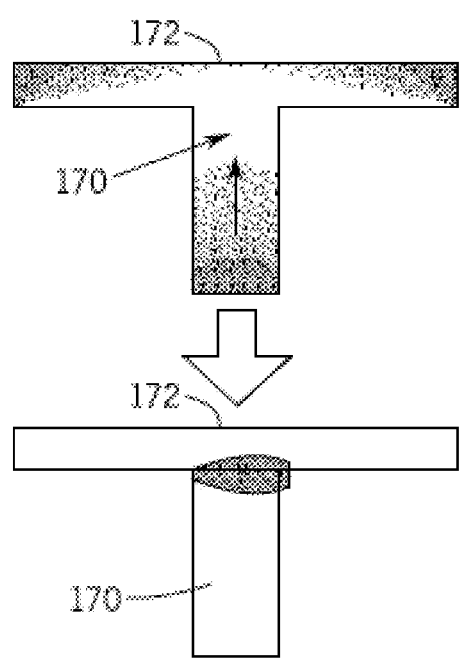
FIG. 20 illustrates a heat profile that may be generated in a T-fillet weld using the hybrid induction arc welding processes in accordance with aspects of the present disclosure.

By heating the surface of the weld to nearly the melting point, the arc then provides sufficient heat to heat the entire thickness of the top member 172, thus eliminating the cool column of metal in the center of the bottom member 170. When the weld cools, the top member 172 is pulled toward the bottom member 170 by the thermal contraction of the center of the top member 172. The shrinking weld deposit shrinks with the top member 172 and does not apply any stress load to the bottom member 170, thus eliminating the weld distortion (see FIG. 20). As described herein, the reduction of stresses and distortion that result from the combined heat profile of the induction heat profile generated by the one or more induction heating coil(s) 36 and the welding heat profile generated by the welding torch 16 may be affected by a determination of an optimum relationship of the positioning of the one or more induction heating coil(s) 36 and/or the welding torch 16 relative to the workpiece(s) 32 being worked on, and independent adjustment of the positioning of the one or more induction heating coil(s) 36 and/or the welding torch 16 consistent with this determination. As described herein, control circuitry (e.g., the control circuitry 54a, 54b, 62 of the welding power supply 12, the preheating power supply 200, and the induction power supply 38, respectively, or some other control circuitry of the system 10) may receive feedback from the sensors and/or sensor modules described herein, and may use this feedback to determine (e.g., estimate) the induction heat profile generated by the one or more induction heating coil(s) 36 and the welding heat profile generated by the welding torch 16, and may combine these determined heat profiles into a combined heat profile, determine an optimum positioning of the one or more induction heating coil(s) 36 and/or the welding torch 16 relative to the workpiece(s) 32 being worked on to minimize the distortion and/or stresses in the workpiece(s) 32, and then implement the determined optimum positioning by, for example, controlling the multiple robotic manipulators 88 or other mechanical motion systems to independently control the position, orientation, and/or movement of the one or more induction heating coil(s) 36 and/or the welding torch 16 relative to the workpiece(s) 32 in accordance with the determined optimum positioning such that the distortion and/or stresses in the workpiece(s) 32 are minimized. For example, in certain embodiments, the determined optimum positioning may lead to substantially no distortion and/or stresses (e.g., less than 5% distortion, less than 2% distortion, less than 1% distortion, less than 0.5% distortion, and so forth) in the workpiece(s) 32. In general, the embodiments described herein lead to welds where the workpiece(s) 32 show at least 60%, or even greater than 80%, reduction in distortion as compared to comparable welds.

Figure 14A:
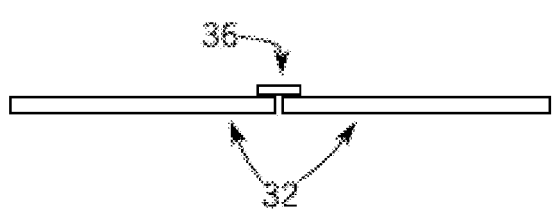
FIGS. 14A and 14B illustrates various induction heating coil configurations, in accordance with aspects of the present disclosure.
Figure 14B:
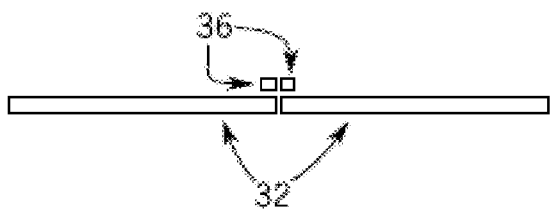

Similar heating patterns can be created in other types of weld joint such as lap joints. There are many different configurations of coil shape that can be applied to the process depending on the welding conditions. Example coil configurations for butt joints are shown in FIGS. 14A and 14B. Example coil configurations for T-fillet joints are shown in FIGS. 8A through 8H.

Figure 21:
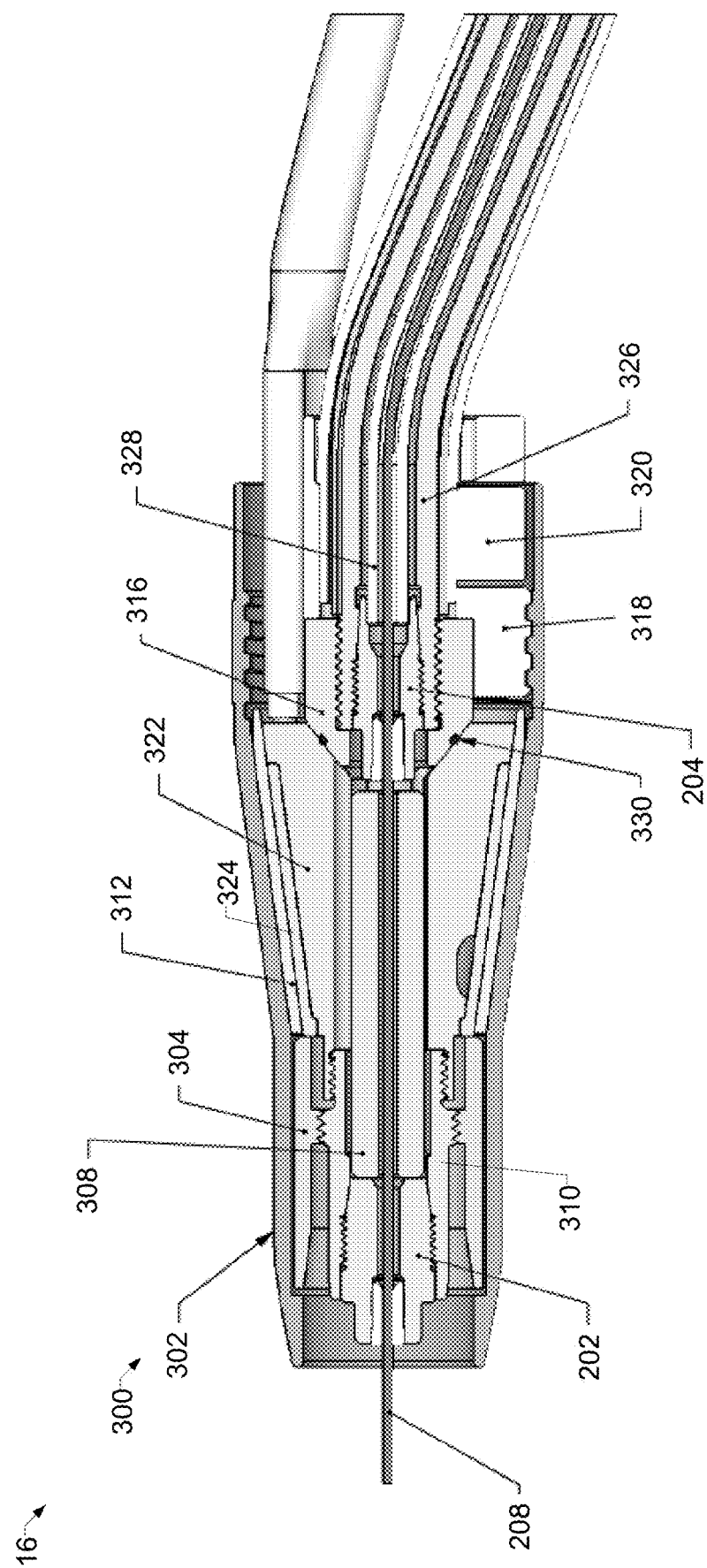
FIG. 21 is a cross-section view of an example nozzle assembly that may be used to implement the welding torch and the contact tips of FIG. 3.

FIG. 21 is a cross-section view of an example nozzle assembly 300 that may be used to implement the welding torch 16 and the contact tips 202, 204 of FIG. 3. The example nozzle assembly 300 includes a nozzle 302, a diffuser insulator 304, the first contact tip 202, a wire guide 308, a gas diffuser 310, a first contact tip insulator 312, the second contact tip 204, a second contact tip insulator 316, a nozzle mount 318, a nozzle mount clamp 320, a cooling body 322, and a cooling body cover 324. The nozzle assembly 300 is attached to a torch neck 326, through which a wire liner 328 conveys the electrode wire 208 and/or shielding gas to the nozzle assembly 300. In the example of FIG. 3, the contact tip 204 receives at least a portion of the wire liner 328 in a bore portion and in electrical contact with the contact tip 204.

The first contact tip 202 delivers welding current to the electrode wire 208 for arc welding. The first contact tip 202 is threaded into a gas diffuser 310, which is in turn threaded into the diffuser insulator 304. The diffuser insulator 304 provides electrical and thermal insulation between the gas diffuser 310 and the nozzle 302.

The gas diffuser 310 is threaded into the cooling body 322. The cooling body 322 conducts welding current and/or preheating current from a weld cable or other conductor of welding and/or preheating current to the diffuser 310, which is electrically connected to the first contact tip 202. The first contact tip insulator 312 and the diffuser insulator 304 provide electrical insulation between the weld current and preheat current path(s) and the nozzle 302.

The second contact tip 204 is electrically coupled to the torch neck 326 to conduct preheating current to and/or from the electrode wire 208. The preheating circuit includes the torch neck 326, the second contact tip 204, the first contact tip 202, a portion of the electrode wire 208 between the second contact tip 204 and the first contact tip 202 (e.g., the section 214 of FIG. 3), the diffuser 310, and the cooling body 322.

The second contact tip insulator 316 provides electrical insulation between the second contact tip 204 and the cooling body 322. The second contact tip insulator 316 includes a seal 330 (e.g., an o-ring) to reduce or prevent welding gas leakage. The nozzle mount 318 and the nozzle mount clamp 320 provide an attachment point for threading the nozzle assembly 300 onto the torch neck 326. In the example of FIG. 25, the first contact tip 202, the wire guide 308, and/or the second contact tip 204 are removable via the tip of the nozzle 302.

Other implementations of the welding torch 16 may be used to implement the welding circuit and/or the preheating circuit. In some other examples, the preheating circuit may be implemented separately from the welding torch 16, such as between the welding torch 16 and the wire feeder 14. While contact tips are used in the foregoing examples, other types of electrical contacts may be used in place of or in addition to contact tips, such as electrically conductive rollers.

Figure 22:
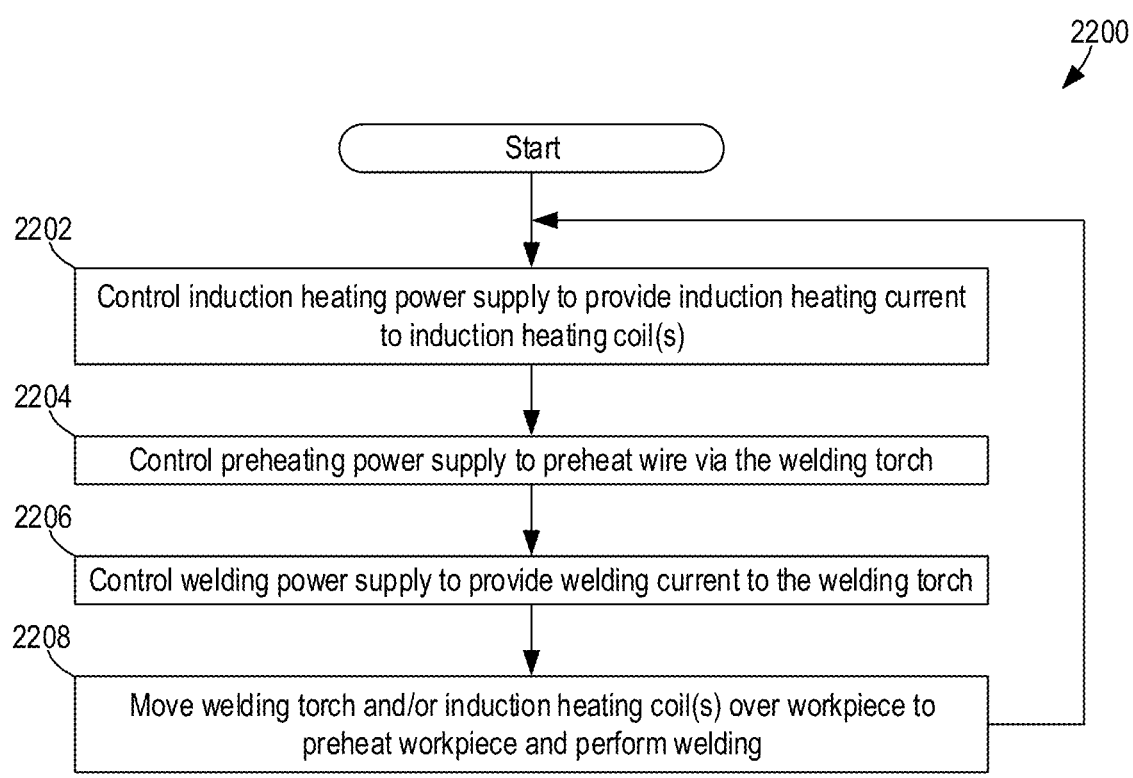
FIG. 22 is a flowchart representative of a method which may be performed to perform welding using induction preheating to preheat the workpiece, and resistive preheating to preheat an electrode wire.

FIG. 22 is a flowchart representative of a method 2200 which may be performed to perform welding using induction preheating to preheat the workpiece, and resistive preheating to preheat an electrode wire. The example method 2200 may be performed to implement the welding system 10 of FIGS. 1-3.

At block 2202, the example induction heating power supply 38 provides induction heating current to the induction heating coil(s) 36. The induction heating coil(s) 36 preheat the workpiece 32 prior to arc welding by the welding torch 16 and/or control post-welding cooling.

At block 2204, the preheating power supply 200 provides preheating power to preheat the electrode wire 208 via the contact tips 202, 204 of the welding torch 16. The preheating of the electrode wire 208 may reduce the amount of energy required by the welding power supply 12 to melt the electrode wire 208 via the arc.

At block 2206, the welding power supply 12 provides welding current to the welding torch 16 (e.g., to the contact tip 202) to perform arc welding with the electrode wire 208.

At block 2208, the robotic manipulator 88 and/or a human operator moves the welding torch 16 and the induction heating coil(s) 36 over the workpiece 32 to preheat the workpiece 32 and perform the welding on the preheated portion of the workpiece 32. The example method 2200 may involve performing blocks 2202-2208 concurrently and/or iterating the blocks 2202-2208 over the duration of a welding operation.

Figure 23:
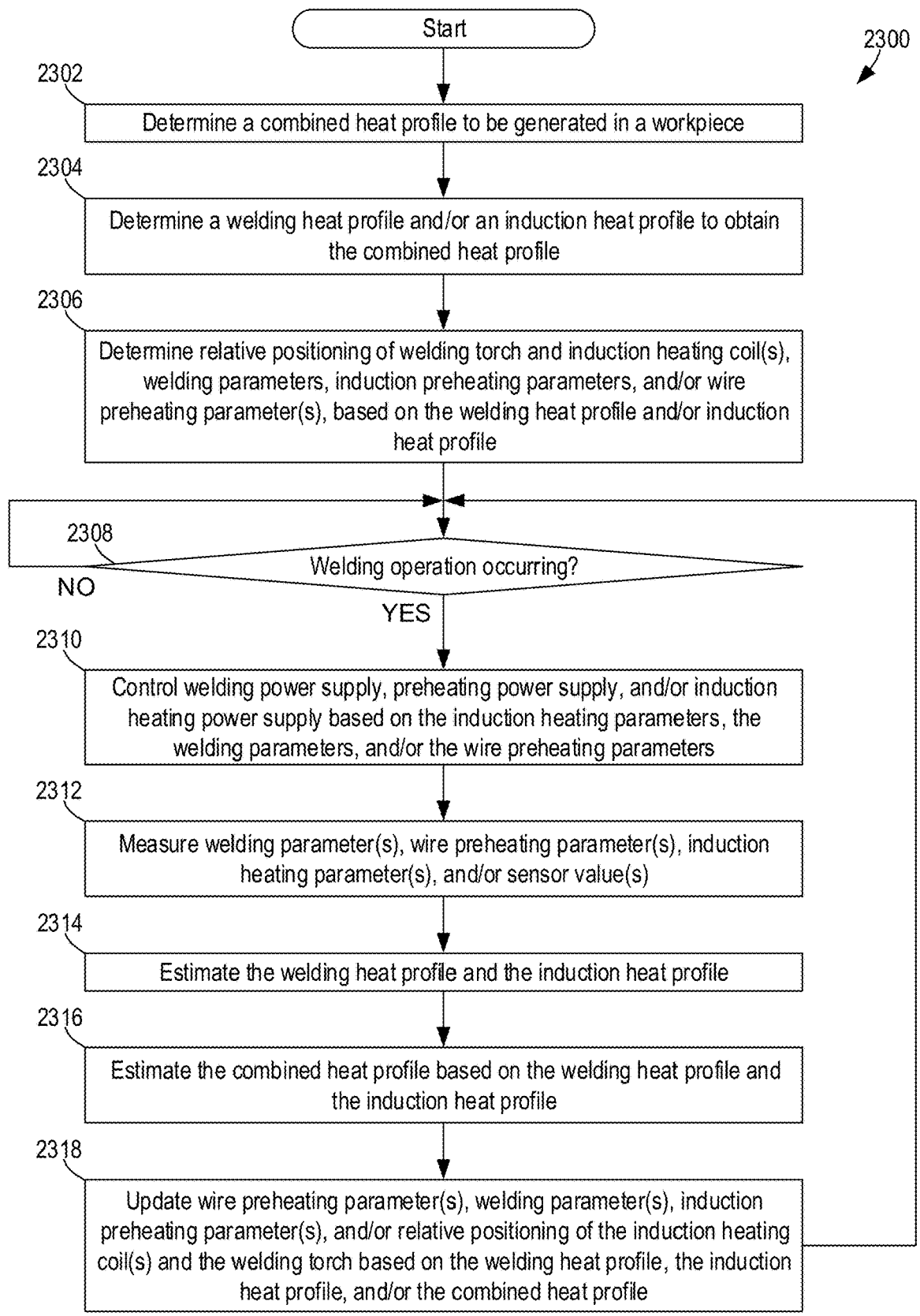
FIG. 23 is a flowchart representative of a method which may be performed to perform welding using induction preheating to preheat the workpiece, and resistive preheating to preheat an electrode wire.

FIG. 23 is a flowchart representative of a method 2300 which may be performed to perform welding using induction preheating to preheat the workpiece, and resistive preheating to preheat an electrode wire. The example method 2300 may be performed to implement the welding system 10 of FIGS. 1-3. For brevity, the method 2300 is described below with reference to the control circuitry 54b of the preheating power supply 200. However, the method 2300 may be performed by any of the control circuitry 54a, 54b, 62 and/or any combination of the control circuitry 54a, 54b, 62.

At block 2302, the control circuit 54b determines a combined heat profile to be generated in a workpiece (e.g., the workpiece 32 of FIG. 1). For example, the control circuit 54b may calculate a combined heat profile based on a thickness of the workpiece 32, a joint type of the workpiece 32, a material type of the workpiece 32, a target total heat input to the workpiece 32, a shielding gas type, and/or a size and/or material of the electrode wire 208, such that distortion of the workpiece 32 is substantially avoided.

At block 2304, the control circuit 54b determines a welding heat profile and/or an induction heat profile to obtain the combined heat profile. For example, the control circuit 54b may determine the respective heating to be applied by each of the welding torch 16 and/or the induction heating coil(s) 36 to achieve the combined heating profile. The example combined heat profile, the welding heat profile, and/or the induction heat profile may be predetermined distribution(s) of heat in the workpiece 32, such as heat-affected zone size, penetration, depth of heating, weld bead size, and/or the like.

At block 2306, the control circuit 54b determines a relative positioning of the welding torch 16 and the induction heating coil(s) 36, welding parameters, induction preheating parameters, and/or wire preheating parameter(s), based on the welding heat profile, the induction heat profile, and/or the combined heat profile. For example, higher penetration welding may involve reduced preheating power applied by the preheating power supply 200 (resulting in more heat applied by the welding power supply 12) while lower-penetration welding may involve increased wire preheating and reduced heat applied by the welding power supply 12. Example preheating parameter(s) that may be determined and/or configured by the control circuit 54b include preheating current, preheating voltage, preheating wattage, impedance between the contact tips 202, 204, an electrode temperature, a power balance between the preheating wattage and arc wattage, a total heat input to the workpiece 32, a preheating enthalpy, a penetration value, a workpiece thickness, a joint type of the workpiece 32, a material type of the workpiece 32, a shielding gas type, or a wire diameter of the electrode wire 208. The relative positioning of the welding torch 16 and/or the induction heating coil(s) 36 (e.g., with respect to one another and/or the workpiece) also affects the generation of the combined heating profile. For example, the control circuit 54b may increase a distance between the welding torch 16 and the induction heating coil(s) 36 to promote heat dispersion in the workpiece 32 prior to welding or reduce a distance between the welding torch 16 and the induction heating coil(s) 36 to reduce heat dispersion and concentrate heat from the induction preheating.

At block 2308, the control circuit 54b determines whether welding is occurring. If welding is not occurring, the control circuit 54b may iterate block 2308 until a weld is initiated and/or return to block 2302 to determine different heat profiles and/or parameters (e.g., in response to a user input).

When welding begins (or is occurring), at block 2310 the control circuitry 54b controls the welding power supply 12, the preheating power supply 200, and the induction heating power supply 38 based on the relative positioning of the welding torch 16 and the induction heating coil(s) 36, the welding parameters, the induction preheating parameters, and/or the wire preheating parameter(s).

At block 2312, one or more sensors (e.g., the sensors 86) measure welding parameter(s), wire preheating parameter(s), induction heating parameter(s), workpiece temperature, and/or other measurements.

At block 2314, the control circuitry 54b estimates the welding heat profile and the induction heat profile (e.g., based on the measurements). At block 2316, the control circuitry 54b estimates the combined heat profile based on the welding heat profile and the induction heat profile. For example, the control circuitry 54b may model the welding heat profile, the induction heat profile, and/or the combined heat profile based on the measured parameters. Additionally or alternatively, the control circuitry 54b may determine whether the measured parameter(s) are within predetermined limits for the measured parameters.

At block 2318, the control circuitry 54b updates the wire preheating parameter(s), the welding parameter(s), the induction preheating parameter(s), and/or relative positioning of the induction heating coil(s) 36 and the welding torch 16 based on the welding heat profile, the induction heat profile, and/or the combined heat profile (e.g., based on measurement values from the sensors 86). For example, the control circuitry 54b may update commands to one or more control loops controlling the welding power supply 12, the preheating power supply 200, and/or the induction heating power supply 38 in response to comparing the estimated welding heat profile, the estimated induction heat profile, and/or the estimated combined heat profile to predetermined or desired profile(s).

Control may then return to block 2308 to continue or end welding control.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A welding system, comprising:
   a welding current source configured to provide welding current to a welding circuit, the welding circuit comprising an electrode wire and a first contact tip of a welding torch;
   an electrode preheating circuit configured to provide preheating current through a first portion of the electrode wire via a second contact tip of the welding torch; and
   at least one induction heating coil configured to apply induction heat to a workpiece, the welding current source, the electrode preheating circuit, and the induction heating coil configured to perform a preheating operation and a welding operation on the workpiece, wherein the welding current source and the electrode preheating circuit are configured to generate a welding heat profile based on the preheating current and the welding current, the at least one induction heating coil is configured to generate an induction heat profile by applying the induction heat, and the welding current source, the electrode preheating circuit, and the at least one induction heating coil are configured to combine the welding heat profile and the induction heat profile to generate a combined heat profile in the workpiece; and
   control circuitry configured to:
      determine the combined heat profile to be generated in a workpiece;
      determine the welding heat profile and the induction heat profile to be generated to generate the combined heat profile in the workpiece to reduce distortion in the workpiece from the welding operation;
      control the welding current source and the electrode preheating circuit based on the welding heat profile;
      control the induction heating coil based on the induction heat profile;
      estimate the welding heat profile and the induction heat profile in the workpiece based on an input during the welding operation;
      estimate the combined heat profile based on the estimated welding heat profile and the estimated induction heat profile; and
      control a positioning of the welding torch, the at least one induction heating coil, or both, based on the estimated combined heat profile.

2. The welding system as defined in claim 1, wherein the control circuitry is configured to estimate at least one of the welding heat profile or the induction heat profile in the workpiece based on feedback from one or more sensors.

3. The welding system as defined in claim 2, wherein the one or more sensors include at least one of: a position-detecting sensor configured to detect a position of at least one of the welding torch or the at least one induction heating coil, relative to the workpiece; or a temperature sensor configured to detect a temperature proximate the workpiece.

4. The welding system as defined in claim 1, wherein the control circuit is configured to:
   compare the estimated combined heat profile to the determined combined heat profile; and
   control at least one of the welding current, the preheating current, the induction heat, a positioning of the welding torch, or a positioning of the at least one induction heating coil, based on the comparison.

5. The welding system as defined in claim 1, wherein the welding heat profile comprises a first predetermined distribution of heat in the workpiece and the induction heat profile comprises a second predetermined distribution of heat in the workpiece.

6. The welding system as defined in claim 1, wherein the control circuitry is configured to control the positioning of the welding torch, the at least one induction heating coil, or both, by transmitting control signals to at least one robotic manipulator.

7. The welding system as defined in claim 6, wherein the control circuitry is configured to control the positioning of the welding torch, the at least one induction heating coil, or both, to minimize distortion in the workpiece.

8. The welding system as defined in claim 6, wherein the control circuitry is configured to control the positioning of the welding torch, the at least one induction heating coil, or both, to produce substantially evenly distributed heat on inner surfaces of the workpiece.

9. The welding system as defined in claim 1, wherein the control circuitry is configured to control at least one of the welding current, the preheating current, or the induction heat based on a target heat input to the workpiece.

10. The welding system as defined in claim 1, wherein the control circuitry is configured to control at least one of the welding current, welding voltage, preheating voltage, or the preheating current based on at least one of a power provided to the at least one induction heating coil or a temperature of the workpiece, sensed by a temperature sensor, following heating by the at least one induction heating coil.

11. The welding system as defined in claim 1, wherein the electrode preheating circuit is configured to reduce cast in the electrode wire via the preheating current, prior to the electrode wire exiting the first contact tip.

12. The welding system as defined in claim 1, wherein the control circuitry is configured to:
  determine a change in a contact-tip-to-work-distance of the welding torch based on at least one of the welding current or the preheating current; and
  adjust at least one of the preheating current or a wire feed speed based on the change in the contact-tip-to-work-distance.

13. The welding system as defined in claim 1, further comprising:
  a preheating feedback circuit configured to measure a preheating voltage, wherein the control circuit is configured to:
    control the preheating current based on the preheating voltage; and
    control the electrode preheating circuit to adjust the preheating current in response to detecting an invalid preheat voltage measured by the preheating feedback circuit.

14. The welding system as defined in claim 1, wherein the control circuitry is configured to control the electrode preheating circuit based on an input specifying a preheating parameter.

15. The welding system as defined in claim 14, wherein the preheating parameter comprises at least one of the preheating current, a preheating voltage, a preheating wattage, impedance, an electrode temperature, a power balance between the preheating wattage and arc wattage, a total heat input to the workpiece, a preheating enthalpy, a penetration value, a workpiece thickness, a joint type of the workpiece, a material type of the workpiece, a shielding gas type, or a wire diameter of the electrode wire.

16. The welding system as defined in claim 14, wherein the control circuitry is configured to control at least one of a welding parameter or an induction heating parameter based on the preheating parameter.

17. The welding system as defined in claim 1, wherein the electrode preheating circuit is configured to reduce diffusible hydrogen present in the electrode wire.

18. The welding system as defined in claim 1, wherein the control circuitry is configured to control at least one of the welding current, the preheating current, or the induction heat based on a travel speed of the at least one induction heating coil and the welding torch relative to the workpiece.

19. The welding system as defined in claim 1, wherein the electrode preheating circuit comprises a second power source configured to provide the preheating current.

20. The welding system as defined in claim 1, further comprising an induction heating power source configured to provide power to the at least one induction heating coil.

21. The welding system as defined in claim 1, wherein the electrode preheating circuit comprises at least one of the first contact tip or a third contact tip.

22. The welding system as defined in claim 1, wherein the control circuitry is configured to monitor a voltage drop across a second portion of the electrode wire and to adjust at least one of the welding current or the preheating current based on the voltage drop, wherein the second portion of the electrode wire comprises at least part of the first portion of the electrode wire.

\* \* \* \* \*